United States Patent
Lee et al.

(10) Patent No.: US 11,854,132 B2
(45) Date of Patent: Dec. 26, 2023

(54) DEVICE AND METHOD FOR AUTOMATICALLY CREATING CARTOON IMAGE BASED ON INPUT SENTENCE

(71) Applicant: Toonsquare CORP., Seoul (KR)

(72) Inventors: Ho Young Lee, Seoul (KR); Gyu Cheol Kim, Gunpo-si (KR); Ho Sop Choi, Gwacheon-si (KR)

(73) Assignee: Toonsquare CORP., Seoul (KR)

( * ) Notice: Subject to any disclaimer, the term of this patent is extended or adjusted under 35 U.S.C. 154(b) by 191 days.

(21) Appl. No.: 17/461,911

(22) Filed: Aug. 30, 2021

(65) Prior Publication Data
US 2022/0067996 A1    Mar. 3, 2022

(30) Foreign Application Priority Data

Aug. 31, 2020  (KR) ................. 10-2020-0110136
Jul. 29, 2021  (KR) ................. 10-2021-0099674

(51) Int. Cl.
*G06T 11/60*    (2006.01)
*G06T 1/60*    (2006.01)
(Continued)

(52) U.S. Cl.
CPC .............. *G06T 1/60* (2013.01); *G06F 18/214* (2023.01); *G06F 40/253* (2020.01); *G06F 40/279* (2020.01)

(58) Field of Classification Search
CPC ...... G06F 40/35; G06F 40/279; G06F 18/214; G06F 40/253; G06F 40/30; G06F 40/40;
(Continued)

(56) References Cited

U.S. PATENT DOCUMENTS 6,069,622 A      5/2000 Kurlander
2016/0027198 A1  1/2016 Terry et al.
(Continued)

FOREIGN PATENT DOCUMENTS

JP    2008-305171 A   12/2008
JP    2020-106910 A    7/2020
(Continued)

OTHER PUBLICATIONS

Makoto Hasegawa, Masaki Hayashi, "A Study on Automatic Manga Generation from TVML Scripts", Proceedings of the 62nd Annual Conference (2001) (3) Databases and Media Networks, Japan, Information Processing Society of Japan, Mar. 13, 2001, pp. 3-61 to 3-62.
(Continued)

*Primary Examiner* — Xilin Guo
(74) *Attorney, Agent, or Firm* — Studebaker & Brackett PC

(57) ABSTRACT

The present disclosure relates to a method for automatically creating a cartoon image based on an input sentence, performed by a device, the method including: recognizing a sentence; identifying word(s) included in the sentence; identifying a type of punctuation mark located at a start point and an end point of the sentence; determining the sentence as one of a general expression sentence, a dialogue expression sentence, and an emotional expression sentence based on the type of the identified punctuation mark; automatically creating a cartoon image based on a word included in the general expression sentence; understanding a subject of the dialogue expression sentence or the emotional expression sentence; and inserting the dialogue expression sentence or the emotional expression sentence in a form of a speech bubble on a character corresponding to the understood subject among at least one character in the cartoon image.

20 Claims, 34 Drawing Sheets

(51) Int. Cl.
*G06F 40/253* (2020.01)
*G06F 40/279* (2020.01)
*G06F 18/214* (2023.01)

(58) Field of Classification Search
CPC .... G06F 3/0237; G06F 3/04886; G06T 11/60; G06T 2200/24; G06T 7/20; G06T 13/40; G06T 1/20; G06V 30/10; G06V 10/82; G06V 30/153; G06N 3/08; G06N 3/045
See application file for complete search history.

(56) References Cited

U.S. PATENT DOCUMENTS

| | | | | |
|---|---|---|---|---|
| 2018/0109482 | A1* | 4/2018 | DeLuca | G06N 20/00 |
| 2021/0034814 | A1* | 2/2021 | Aggarwal | G06F 40/205 |
| 2021/0192824 | A1* | 6/2021 | Chen | H04L 51/02 |
| 2021/0366462 | A1* | 11/2021 | Yang | G10L 13/08 |

FOREIGN PATENT DOCUMENTS

| | | |
|---|---|---|
| KR | 10-1244789 B1 | 3/2013 |
| KR | 10-2016-0060472 A | 5/2016 |
| KR | 10-2020-0021702 A | 3/2020 |
| KR | 10-2020-0025062 A | 3/2020 |
| KR | 10-2020-0069786 A | 6/2020 |

OTHER PUBLICATIONS

An Office Action mailed by the Korean Intellectual Property Office dated Mar. 11, 2022, which corresponds to Korean Patent Application No. 10-2020-0110136.

The extended European search report issued by the European Patent Office dated May 3, 2022, which corresponds to European Patent Application No. 21193177.9-1203.

An Office Action; "Notice of Reasons for Refusal," mailed by the Japanese Patent Office dated Aug. 9, 2022, which corresponds to Japanese Patent Application No. 2021-140611.

An Examination Report mailed by the Australian Patent Office dated Nov. 11, 2022, which corresponds to Australian Patent Application 2021269326.

Fuwen Tan et al., "Text2Scene: Generating Compositional Scenes from Textual Descriptions", CVPR 2019, Jun. 9, 2019, pp. 1-17, arxiv:1809.01110v3 [cs.CV].

An Office Action mailed by the Korean Intellectual Property Office dated Apr. 4, 2023, which corresponds to Korean Patent Application No. 10-2021-0099674 and is related to U.S. Appl. No. 17/461,911.

* cited by examiner

DEVICE AND METHOD FOR AUTOMATICALLY CREATING CARTOON IMAGE BASED ON INPUT SENTENCE

CROSS-REFERENCE TO RELATED APPLICATION

A claim for priority under 35 U.S.C. § 119 is made to Korean Patent Application Nos. 10-2020-0110136 filed on Aug. 31, 2020 and 10-2021-0099674 filed on Jul. 29, 2021 in the Korean Intellectual Property Office, the entire contents of which are hereby incorporated by reference.

BACKGROUND

1. Technical Field

The present disclosure relates to a device and method for automatically creating a cartoon image based on an input sentence.

2. Description of Related Art

Exports of the domestic content industry increased by 8.1% last year, exceeding $10 billion for the first time in history. In particular, the global turnover of Korean webtoons exceeded 1 trillion won for the first time, along with the brisk entry of webtoon platforms, Naver and Kakao, into overseas markets. As such, many people of various age groups are looking for webtoons, and many people visit academies to hand draw webtoons, rather than just watching webtoons. However, it is not easy to hand draw a webtoon for those who are not art majors or have limited natural talents in drawing.

Therefore, in order to address such content creator limitations, conventionally, a character service technology has been provided in which a user directly selects pre-made facial feature icons (for example, hair, eyes, nose, mouth, facial contours, and facial expressions) and beauty style icons (for example, hair style, accessories, and clothes), and creates a character by combining the selected icons.

In such character service technology, in order to create a cartoon image desired by a user, background setting, character setting, and brightness setting need to be worked on one by one in most cases.

In addition, such character service technology may cause limitations when creating characters expressing various motions. For example, when a character expresses a motion of bending waist, a blank may occur depending on the movement of waist joints, and thus the character may be expressed unnaturally.

Accordingly, there is a need for a method that can easily create a cartoon image desired by a user without the user having to manipulate cartoon image elements in one by one fashion.

In addition, when a character expressing various motions is created, a method capable of creating a character enabling natural motion by removing a blank generated according to the movement of joint portions of the character is required.

3. Related Art Document

Patent Document
Korean Patent Application Publication No. 10-2020-0025062, Mar. 10, 2020

SUMMARY

An aspect of the present disclosure is directed to automatically creating a cartoon image according to a sentence input by a user.

In addition, an aspect of the present disclosure is directing to creating a joint-bridge in a blank area formed on joint portions or connection portions of a character.

In addition, an aspect of the present disclosure is directed to creating a joint-bridge by rotating a portion of a character to create a joint-bridge at a preset angle, based on a rotation axis.

The aspects of the present disclosure are not limited to those mentioned above, and other aspects not mentioned herein will be clearly understood by those skilled in the art from the following description.

A method for automatically creating a cartoon image based on an input sentence, performed by a device according to the present disclosure, may include: recognizing a sentence when at least one sentence is input; identifying each of at least one word included in the recognized sentence; identifying a type of punctuation mark located at least one of a start point and an end point of the recognized sentence; determining the sentence as any one of a general expression sentence, a dialogue expression sentence, and an emotional expression sentence based on the type of the identified punctuation mark; automatically creating a cartoon image based on a word included in the general expression sentence when the sentence is the general expression sentence, wherein the cartoon image includes at least one character having at least one theme; understanding a subject of the dialogue expression sentence or the emotional expression sentence when the sentence is the dialogue expression sentence or the emotional expression sentence; and inserting the dialogue expression sentence or the emotional expression sentence in a form of a speech bubble on a character corresponding to the understood subject among at least one character in the cartoon image.

First, in the recognition of the sentence, when the at least one sentence is a plurality of sentences, each of words included in each of the plurality of sentences is identified, a sentence component of each of the identified words is understood, and a correlation between the plurality of sentences based on the understood sentence component is understood, so that the plurality of sentences may be grouped into at least one paragraph.

Accordingly, in the identification of the type of punctuation mark, the type of the punctuation mark located at least one of a start point and an end point of at least one sentence included in the grouped paragraph may be identified.

Next, in the determination of the sentence, when the identified punctuation mark is located only at an end point, the recognized sentence may be determined to be the general expression sentence; when the type of the identified punctuation mark is double quotation marks, the recognized sentence may be determined to be the dialogue expression sentence; and when the type of the identified punctuation mark is single quotation marks, the recognized sentence may be determined to be the emotional expression sentence.

In addition, the determination of the sentence may further determine whether the sentence is an emotional expression sentence based on the type of the identified punctuation mark.

Accordingly, in the automatic creation, a face of a character corresponding to the understood subject with respect to the emotional expression sentence may be displayed by zooming in at a preset magnification or by changing a shape of the face.

In addition, in the determination of the sentence, when the identified punctuation mark is located at an end point and the type of the identified punctuation mark is any one of an exclamation mark and a question mark, the recognized sentence may be determined to be the emotional expression sentence.

Alternatively, in the determination of the sentence, when a preset emoticon or abbreviation is located in the recognized sentence, the recognized sentence may be determined to be the emotional expression sentence.

Next, in the automatic creation, when the word represents any one of a subject, an object, and a complement, the character having a theme corresponding to the word may be created; when the word represents a place, a background of the cartoon image may be created based on the word; and when the word represents time, brightness of the cartoon image may be determined based on the word.

In addition, the automatic creation may determine a verb related to the created character in the general expression sentence, and create the character to represent a motion corresponding to the determined verb.

In addition, the automatic creation may determine a size and a location of the created character and a size and a location of the speech bubble based on an object arrangement algorithm.

When user's manipulation information for the cartoon image is input, the object arrangement algorithm may build a learning data set by matching the manipulation information with the cartoon image, and be machine learned based on the built learning data set.

In addition, a device includes a communication unit for obtaining at least one sentence, and a processor according to the present disclosure. The processor may be configured to: recognize the at least one sentence; identify each of at least one word included in the recognized sentence; identify a type of punctuation mark located at least one of a start point and an end point of the recognized sentence; determine the sentence as any one of a general expression sentence, a dialogue expression sentence, and an emotional expression sentence based on the type of the identified punctuation mark; automatically create a cartoon image based on a word included in the general expression sentence when the sentence is the general expression sentence, wherein the cartoon image is created to include at least one character having at least one theme; understand a subject of the dialogue expression sentence or the emotional expression sentence when the sentence is the dialogue expression sentence or the emotional expression sentence; and insert the dialogue expression sentence or the emotional expression sentence in a form of a speech bubble on a character corresponding to the understood subject among at least one character in the cartoon image.

In addition, when recognizing the sentence, in the case where the at least one sentence is a plurality of sentences, the processor may identify each of words included in each of the plurality of sentences, understand a sentence component of each of the identified words, and understand a correlation between the plurality of sentences based on the understood sentence component, so that the plurality of sentences may be grouped into at least one paragraph. When identifying the type of punctuation mark, the processor may identify the type of the punctuation mark located at least one of a start point and an end point of at least one sentence included in the grouped paragraph.

Next, when determining the sentence, in the case where the identified punctuation mark is located only at an end point, the processor may determine the recognized sentence to be the general expression sentence; in the case where the type of the identified punctuation mark is double quotation marks, the processor may determine the recognized sentence to be the dialogue expression sentence; and in the case where the type of the identified punctuation mark is single quotation marks, the processor may determine the recognized sentence to be the emotional expression sentence.

In addition, when determining the sentence, the processor may further determine whether the sentence is an emotional expression sentence based on the type of the identified punctuation mark. When automatically creating the cartoon image, the processor may display a face of a character corresponding to the understood subject with respect to the emotional expression sentence by zooming in at a preset magnification or by changing a shape of the face.

In addition, when determining the sentence, in the case where the identified punctuation mark is located at an end point and the type of the identified punctuation mark is any one of an exclamation mark and a question mark, the processor may determine the recognized sentence to be the emotional expression sentence. Alternatively, in the case where a preset emoticon or abbreviation is located in the recognized sentence, the processor may determine the recognized sentence to be the emotional expression sentence.

In addition, when automatically creating the cartoon image, in the case where the word represents any one of a subject, an object, and a complement, the character having a theme corresponding to the word may be created; in the case where the word represents a place, a background of the cartoon image may be created based on the word; and in the case where the word represents time, brightness of the cartoon image may be determined based on the word.

In addition, when automatically creating the cartoon image, the processor may determine a verb related to the created character in the general expression sentence, and create the character to represent a motion corresponding to the determined verb.

In addition, when automatically creating the cartoon image, the processor may determine a size and a location of the created character and a size and a location of the speech bubble based on an object arrangement algorithm. When user's manipulation information for the cartoon image is input, the object arrangement algorithm may build a learning data set by matching the manipulation information with the cartoon image, and be machine learned based on the built learning data set.

In addition, when automatically creating the cartoon image, the processor may create and display central joint-bridge data connecting joint portions separated into a first element and a second element of the when creating the character, create and display first-direction joint-bridge data connecting the first element and the second element of the character in a first direction or second-direction joint-bridge data connecting the first element and the second element of the character in a second direction, receive a selection of a first element motion design or a second element motion design corresponding to each of the central joint-bridge data, the first direction joint-bridge data, or the second-direction joint-bridge data from a user terminal, and match the character.

In addition, the joint-bridge may be disposed to overlap a blank area between the first element and the second element of the character.

In addition, when creating and displaying the second-direction joint-bridge data, the processor may create and display the first direction joint-bridge data and the second-direction joint-bridge data by rotating the character based on a rotation axis.

In addition, another method for implementing the present disclosure, another system, and a computer-readable recording medium for recording a computer program for executing the method may be further provided.

According to the present disclosure, by automatically creating a cartoon image according to a sentence input by a user, even a person without drawing skills can easily obtain a desired cartoon image.

In addition, according to the present disclosure, the movement of joint portions or connection portions of a character is made natural by creating a joint-bridge in a blank area formed on the joint portions or connection portions of the character.

In addition, according to the present disclosure, it is possible to express a character having a natural joint-bridge by creating a joint-bridge by rotating a portion of the character to create a joint-bridge at a preset angle, based on a rotation axis.

The advantages of the present disclosure are not limited to those mentioned above, and other advantages not mentioned herein will be clearly understood by those skilled in the art from the following description.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate the existence of one or more other elements other than stated elements but do not exclude presence of additional elements. Like reference denotations refer to like elements throughout the specification. As used herein, the term "and/or" includes each and all combinations of one or more of the mentioned elements. It will be understood that, although the terms "first," "second," etc., may be used herein to describe various elements, these elements should not be limited by these terms. These terms are only used to distinguish one element from another element. Accordingly, a first element mentioned below could be termed a second element without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, the embodiments of the present disclosure will be described in detail with reference to the accompanying drawings.

Figure 1:
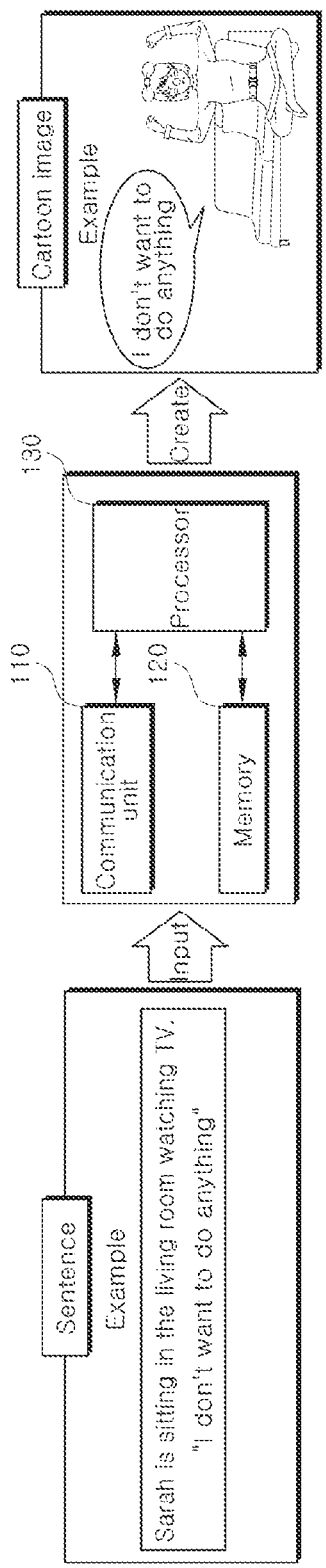
FIG. 1 is a diagram illustrating a device for automatically creating a cartoon image based on an input sentence according to the present disclosure.

FIG. 1 is a diagram illustrating a device 10 for automatically creating a cartoon image based on an input sentence according to the present disclosure.

Hereinafter, the device 10 for automatically creating a cartoon image based on an input sentence according to the present disclosure will be described with reference to FIG. 1.

When at least one sentence is input, the device 10 may recognize the sentence and identify each of at least one word included in the recognized sentence.

In addition, the device 10 may identify a type of punctuation mark located at least one of a start point and an end point of the recognized sentence, and determine the sentence as any one of a general expression sentence, a dialogue expression sentence, and an emotional expression sentence based on the type of the identified punctuation mark.

The device 10 may automatically create a cartoon image based on a word included in the general expression sentence when the sentence is the general expression sentence.

The device 10 may understand a subject of the dialogue expression sentence or the emotional expression sentence when the sentence is the dialogue expression sentence or the emotional expression sentence.

The device 10 may insert the dialogue expression sentence or the emotional expression sentence in a form of a speech bubble on the character corresponding to the understood subject among at least one character in the cartoon image.

The device 10 automatically creates a cartoon image according to a sentence input by a user, so that even a person without drawing skills can easily obtain a desired cartoon image.

In other words, the device 10 may analyze a character, a place, a situation, an atmosphere, and an emotion through the words in the input sentence, and may convert the cartoon image (corresponding cut) to various objects (person, animal, background, pose, facial expression).

The device 10 may include all of a variety of devices capable of providing a result to a user by performing arithmetic processing.

In other words, the device 10 may be in a form including at least one of a computer, a server, a mobile terminal, and a smart phone.

The device 10 may be in the form of a computer. More specifically, the computer may include all of a variety of devices capable of providing a result to a user by performing arithmetic processing.

For example, the computer may be a smart phone, a tablet PC, a cellular phone, a mobile terminal of a personal communication service phone (PCS phone), a synchronous/asynchronous international mobile telecommunication-2000 (IMT-2000), a palm personal computer (palm PC), and a personal digital assistant (PDA) or the like, as well as a desktop PC or a laptop computer. In addition, when a head mounted display (HMD) device includes a computing function, the HMD device may be a computer.

In addition, the computer may correspond to a server that receives a request from a client and performs information processing.

The device 10 may include a communication unit 110, a memory 120, and a processor 130. Here, the device 10 may include fewer or more components than those illustrated in FIG. 1.

The communication unit 110 may include one or more modules that enables wireless communication between the device 10 and an external device (not shown), between the device 10 and an external server (not shown), or between the device 10 and a communication network (not shown).

The external device (not shown) may be a user terminal. The user terminal may be any one of a digital device such as a cellular phone including a display unit, an input unit, and a communication function, a smart phone, a PDA, a portable multimedia player (PMP), a tablet PC, a personal computer (for example, a desktop computer, and a notebook computer), a workstation, a PDA, or a web pad.

In addition, when the external server (not shown) receives an application download request of a service that automatically creates a cartoon image based on a sentence input from the external device (not shown), user authentication may be performed. When user authentication is completed, the external device (not shown) may transmit the requested application of the service.

In addition, a communication network (not shown) may transmit/receive various information between the device 10, the external device (not shown), and an external server (not shown). For the communication network, various types of communication networks may be used. For example, the communication network may use wireless communication methods, such as wireless LAN (WLAN), Wi-Fi, Wibro, Wimax and High-Speed Downlink Packet Access (HSDPA) methods, or wired communication methods, such as Ethernet, xDSL (ADSL and VDSL), Hybrid Fiber Coax (HFC), Fiber To The Curb (FTTC) and Fiber To The Home (FTTH) methods.

The communication network (not shown) is not limited to the communication methods presented above, and may include all types of communication methods widely known or to be developed in the future in addition to the above communication methods.

In addition, the communication unit 110 may include one or more modules for connecting the device 10 to one or more networks.

Such the communication unit 110 may obtain at least one sentence. In more detail, the communication unit 110 may obtain the at least one sentence input through a website or application provided to an external device (not shown), for example, a user terminal (not shown).

The website or application may be to provide a service for automatically creating a cartoon image based on an input sentence.

The memory 120 may store data supporting various functions of the device 10. The memory 120 may store a plurality of application programs (or applications) driven in the device 10, data for operation of the device 10, and commands. At least some of these applications may exist for basic functions of the device 10. The application program may be stored in the memory 120, installed on the device 10, and driven by the processor 130 to perform an operation (or function) of the device 10.

In addition, the memory 120 may include a plurality of processes for automatically creating a cartoon image based on an input sentence according to the present disclosure. The plurality of processes will be described later when an operation of the processor 130 is described.

In addition to the operation related to the application program, the processor 130 may generally control the overall operation of the device 10. The processor 130 may provide or process appropriate information or functions to a user by processing signals, data, and information input or output through the above-described components or by driving an application program stored in the memory 120.

In addition, the processor 130 may control at least some of the components discussed with reference to FIG. 1 in order to drive an application program stored in the memory 120. Furthermore, in order to drive the application program, the processor 130 may operate at least two or more of the components included in the device 10 in combination with each other.

In addition, the processor 130 may provide a website or application for automatically creating a cartoon image based on an input sentence.

Accordingly, an external device (not shown), for example, a user terminal (not shown) may use a website provided by the device 10 through the Internet or download the application provided by the device 10 from the external server (not shown), for example, a download server, for use.

When at least one sentence is input, the processor 130 may recognize the sentence.

When at least one sentence is input through a user interface (UI) of the website or the application based on a first process among a plurality of processes, the processor 130 may recognize the sentence.

When the at least one sentence is a plurality of sentences, the processor 130 may identify each of the words included in each of the plurality of sentences, and understand a sentence component of each of the identified words.

Here, the sentence component may be elements that need to be prepared to form a single sentence. In other words, the sentence component may be an element that plays a certain role while composing the sentence.

For example, the sentence component may include a main component, a subcomponent, and an independent component. The main component may include a subject, a predicate, an object, and a complement. The subcomponent may include an adjective and an adverb. The independent component may include an independent word.

In addition, the processor 130 may group the plurality of sentences into at least one paragraph by determining the correlation between the plurality of sentences based on the understood sentence components.

Accordingly, the processor 130 may automatically group the paragraph based on the sentence components even when a plurality of sentences such as article contents or book contents are input through the UI, thereby easily converting contents incomprehensible into sentences into cartoon images to be provided to a user.

The processor 130 may identify each of at least one word included in the recognized sentence.

The processor 130 may identify each of the at least one word included in the recognized sentence based on the second process among the plurality of processes.

As an example, when the sentence 'John takes a fast walk along the trail' is recognized, at least one word included in the sentence 'John', 'trail', 'fast', "takes a walk' may be identified, respectively.

In other words, the at least one word may be classified into a person, a place, an element, an effect, and a time, and the processor 130 may create a cartoon image based on the classified word.

The processor 130 may identify a type of punctuation mark located at least one of a start point and an end point of the recognized sentence.

The processor 130 may identify a type of punctuation mark located at least one of a start point and an end point of the recognized sentence based on a third process among a plurality of processes.

For example, the processor 130 may identify double quotation marks or single quotation marks located at a start point and an end point of the recognized sentence, and identify at least one of a period, an exclamation point, a question mark, and an ellipsis, located at the end point of the recognized sentence.

In addition, when the at least one sentence is a plurality of sentences, the processor 130 may identify a type of punctuation mark located at least one of a start point and an end point of at least one sentence included in the grouped paragraph.

The processor 130 may determine the type of the sentence based on the type of the identified punctuation mark.

The processor 130 may determine the sentence as any one of a general expression sentence, a dialogue expression sentence, and an emotional expression sentence based on the type of the identified punctuation mark based on the fourth process among the plurality of processes.

Specifically, when the identified punctuation mark is located only at an end point, the processor 130 may determine the recognized sentence as the general expression sentence.

For example, when the period, which is the identified punctuation mark, of the first sentence (for example, Chulsoo is sitting on the sofa watching TV.) is located only at an end point, the first processor 130 may determine the first sentence as the general expression sentence.

In addition, when the type of the identified punctuation mark is double quotation marks, the processor 130 may determine the recognized sentence as the dialogue expression sentence.

For example, when the type of the identified punctuation mark of the second sentence (for example, "Isn't the weather too hot today?") is a double quotation mark, the processor 130 may determine the second sentence as the dialogue expression sentence.

In addition, when the type of the identified punctuation mark is a single quotation mark, the processor 130 may determine the recognized sentence as an emotional expression sentence.

For example, when the type of the identified punctuation mark of the third sentence (for example, 'I'm bored') is a single quotation mark, the processor 130 may determine the third sentence as an emotional expression sentence.

In addition, when the identified punctuation mark is located at an end point and the type of the identified punctuation mark is any one of an exclamation mark and a question mark, the processor 130 may determine the recognized sentence as an emotional expression sentence.

For example, since the identified punctuation mark of the fourth sentence (for example, hungry!!!) is located at the end point, and the type of the identified punctuation mark is an exclamation mark, the processor 130 may determine the fourth sentence as an emotional expression sentence.

Alternatively, when a preset emoticon or abbreviation is located in the recognized sentence, the processor 130 may determine the recognized sentence as an emotional expression sentence.

For example, the processor 130 may determine the fifth sentence as an emotional expression sentence because the first emoticon (for example, ㅠㅠ) is located in the fifth sentence (for example, I am tired ㅠㅠ).

In addition, when the at least one sentence is a plurality of sentences, the processor may extract a specific sentence in which the subject is changed among the sentence components in the at least one sentence, or a specific sentence in which at least one of a predicate, an adjective, and an adverb among the sentence components includes an opposite word based on an artificial intelligence model for at least one sentence included last among the grouped paragraph.

The processor 130 may create the extracted specific sentence as the last cartoon image.

Accordingly, the processor 130 may create the last cartoon image among at least one or more cartoon images as the specific sentence, thereby having a reversal and adding curiosity about the subsequent cartoon.

The artificial intelligence model may include a Recurrent Neural Network (RNN).

Such an RNN is a deep learning technique that is effective for learning the sequence through a structure in which a specific part is repeated, and allows the state value of the previous state to enter the input of the next computation and affect the result (this is because when recognizing words, sentences, and images, it is necessary to refer to the preceding words, letters, and frames to recognize them).

In addition, the RNN may be mainly used to recognize sequential information such as speech and letters.

However, the joint prediction model according to the present disclosure is not limited to CNN and RNN, and may be formed of neural networks having various structures.

When the sentence is the general expression sentence, the processor 130 may automatically create a cartoon image based on the general expression sentence.

When the sentence is the general expression sentence based on a fifth process among a plurality of processes, the processor 130 may automatically create a cartoon image based on a word included in the general expression sentence.

The cartoon image may include at least one character having at least one theme.

Specifically, when the word represents any one of a subject, an object, and a complement, the processor 130 may create the character having a theme corresponding to the word.

In addition, when the word represents a place, the processor 130 may create a background of the cartoon image based on the word.

Specifically, when the word represents a place (or location), the processor 130 may display the image as an image representing the place in the background of the cartoon image.

In more detail, the processor 130 may search for images related to the place text keyword on the web through a preset web browser or a search function, and select an image having the most identicalness among the searched images.

In addition, the processor 130 may display an image having a location that matches or is closest to a location of a place matching the word among location information included in the meta information of the searched images on the background.

In addition, when two or more words represent respective places, the processor 130 may first determine whether the relationship between the two places represents a path through which the two places need to be moved to a specific location.

As an example, the processor 130 may determine whether the relationship between the two places represents the path when the Gangnam Station at Exit 1 and the Kukkiwon Intersection in the example sentence (~from Gangnam Station at Exit 1 to the Kukkiwon Intersection~) represent the respective places.

Then, as a result of the determination, when the relationship between the two places represents the path, the processor 130 may search for a moving path to the two places, create a path image representing the searched moving path, and display it as a background.

In addition, the processor 130 may search for first and second images representing each of the two places, first display an image of a place closest to the user's current location as a background, and then display an image in the following places in a slideshow after a preset time.

Here, the current location of the user may be created based on a GPS signal of a user terminal (not shown) used by the user or a current location directly input by the user.

Alternatively, after dividing the background of the cartoon image into first and second areas, the processor 130 may sequentially display the first image and the second image in each of the divided areas.

Alternatively, the processor 130 may preferentially display an image of a place with or without a visit history among two places as a background based on location information collected for a preset period whenever the user terminal (not shown) moves.

In addition, when the word represents time, the processor 130 may determine the brightness of the cartoon image based on the word.

Specifically, when the word represents a specific time, the processor 130 may display the image with the brightness corresponding to the specific time at the location corresponding to the background image.

For example, when the location corresponding to the background image is the Han River Park, the processor 130 makes the brightness the brightest (or darkest) when the specific time is 1:00 PM, and makes the brightness the darkest (or brightest) when the specific time is 10:00 PM.

In addition, when two or more words each represent time, the processor 130 may display the image with a first brightness corresponding to the first time of the first word closest to the current time.

Then, after the first time has elapsed, the processor 130 may display the image with the first brightness as the second brightness corresponding to the second time of the second word.

In addition, when two or more words represent a specific time and a specific place, in this case, since it is most related to the schedule, and thus the processor 130 may display the cartoon image representing the specific time and specific place as the background of the corresponding date of the calendar application.

In addition, the processor 130 may determine a verb related to the created character in the general expression sentence, and create the character to represent a motion corresponding to the determined verb.

In addition, the processor 130 may determine the size and location of the created character and the size and location of the speech bubble based on the object arrangement algorithm.

In addition, the processor 130 may determine a size, location, arrangement, and overlapping degree of an object so as to conform to the intention of the writer of the input sentence by using the object arrangement algorithm.

When the user's manipulation information for the cartoon image is input, the object arrangement algorithm builds a learning data set by matching the manipulation information with the cartoon image, and be machine learned based on the built learning data set.

Accordingly, the processor 130 may apply the object arrangement algorithm to each user.

In addition, the processor 130 may build a learning data set of the object arrangement algorithm according to the user's needs by matching the manipulation information with the cartoon image, so that due to the accumulation of the data set, a cartoon image in a direction desired by the user may be directly created in the future.

The manipulation information may include at least one of first information, second information, third information, and fourth information.

The first information is information about the size and location change of the character, left-right inversion, and up-and-down inversion, the second information is information about the change in the expression of the character and the change in the motion of the character, the third information is information about the addition or deletion of the character or the object and the change of the background, and the fourth information is information may be information about the change of the perspective of the character or the object.

The processor 130 may receive the dialogue of the speech bubble and correction information of the object from the user with respect to the cartoon image arranged through the object arrangement algorithm.

The correction information is again utilized as learning data for advancing the object arrangement algorithm. Even when the same text is written next time, the expression of the object or the atmosphere of the cut may be slightly different.

In addition, the processor 130 may continuously advance the object arrangement algorithm by collecting previously published professional webtoons and learning the composition of a cut composed by an actual professional writer.

In addition, the processor 130 may understand a subject for an emotional expression sentence and display the face of the character corresponding to the understood subject by zooming in at a preset magnification or by changing the shape of the face.

For example, the processor 130 may change the shape of the face to be slightly or wide smile depending on the degree of happy emotion, or change the degree of frown face according to the degree of bad emotion.

The processor 130 may understand a subject of the dialogue expression sentence or the emotional expression sentence.

When the sentence is the dialogue expression sentence or the emotional expression sentence based on a sixth process among a plurality of processes, the processor 130 may understand the subject of the dialogue expression sentence or the emotional expression sentence.

The processor 130 may insert the dialogue expression sentence or the emotional expression sentence in the form of a speech bubble on the character corresponding to the understood subject.

The processor 130 may insert the dialogue expression sentence or the emotional expression sentence in the form of a speech bubble on the character corresponding to the understood subject among at least one character in the cartoon image based on a seventh process among a plurality of processes.

Additionally, when the word represents a place (or location), the processor 130 may display the image as an image representing the place in the background of the cartoon image.

In more detail, the processor 130 may search for images related to the place text keyword on the web through a preset web browser or a search function, and select an image having the most identicalness among the searched images.

In addition, the processor 130 may display an image having a location that matches or is closest to a location of a place matching the word among location information included in the meta information of the searched images on the background.

In addition, when two or more words represent respective places, the processor 130 may first determine whether the relationship between the two places represents a path by which the two places need to be moved to a specific location.

As an example, the processor 130 may determine whether the relationship between the two places represents the path when the Gangnam Station at Exit 1 and the Kukkiwon Intersection in the example sentence (~from Gangnam Station at Exit 1 to the Kukkiwon Intersection~) represent the respective places.

Then, as a result of the determination, when the relationship between the two places represents the path, the processor 130 may search for a moving path to the two places, create a path image representing the searched moving path, and display it as a background.

In more detail, the processor 130 may search for first and second images representing each of the two places, first display an image of a place closest to the user's current location as a background, and then perform display an image in the following places in a slideshow after a preset time.

Alternatively, after dividing the background of the cartoon image into first and second areas, the processor 130 may sequentially display the first image and the second image in each of the divided areas.

When the word represents a specific time, the processor 130 may display the image with the brightness corresponding to the specific time at the location corresponding to the background image.

For example, when the location corresponding to the background image is the Han River Park, the processor 130 makes the brightness the brightest (or darkest) when the specific time is 1:00 PM, and makes the brightness the darkest (or brightest) when the specific time is 10:00 PM.

In addition, when two or more words each represent time, the processor 130 may display the image with a first brightness corresponding to the first time of the first word closest to the current time.

Then, after the first time has elapsed, the processor 130 may display the image with the first brightness as the second brightness corresponding to the second time of the second word.

In addition, when two or more words represent a specific time and a specific place, in this case, since it is most related to the schedule, and thus the processor 130 may display the cartoon image representing the specific time and specific place as the background of the corresponding date of the calendar application.

Figure 2A:
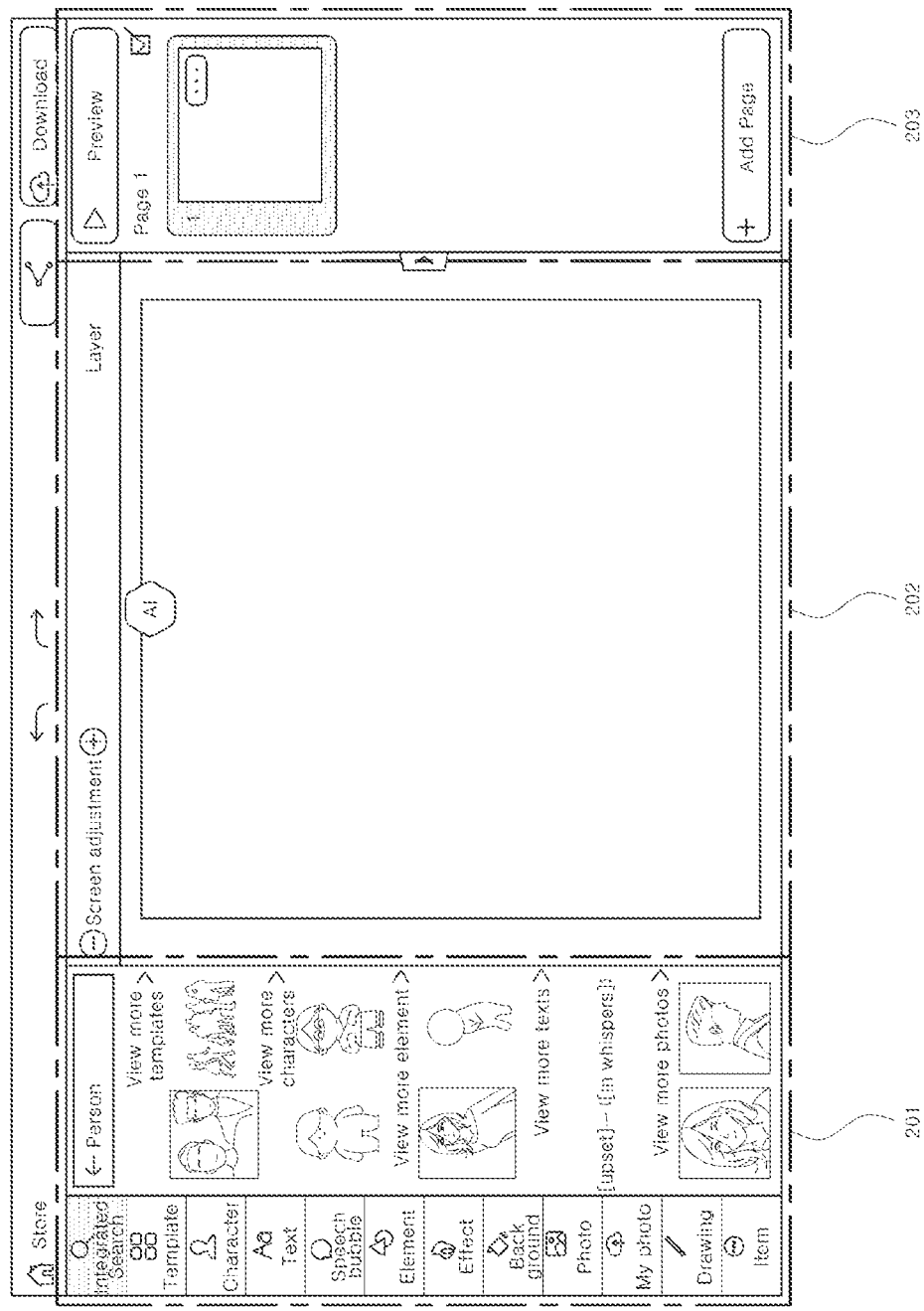
FIGS. 2A to 2C are exemplary diagrams illustrating an operation performed by a processor of a device for automatically creating a cartoon image based on an input sentence according to the present disclosure.
Figure 2B:
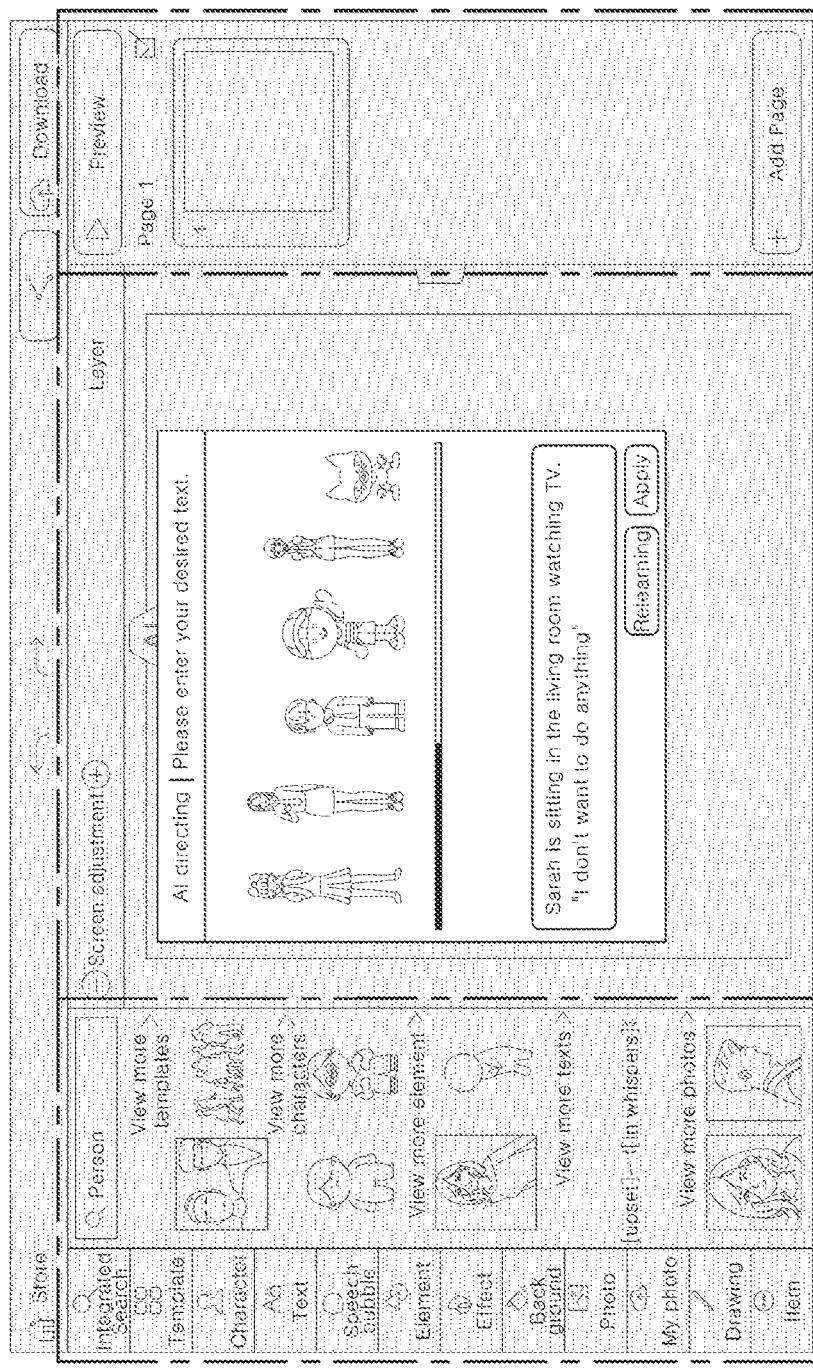
Figure 2C:
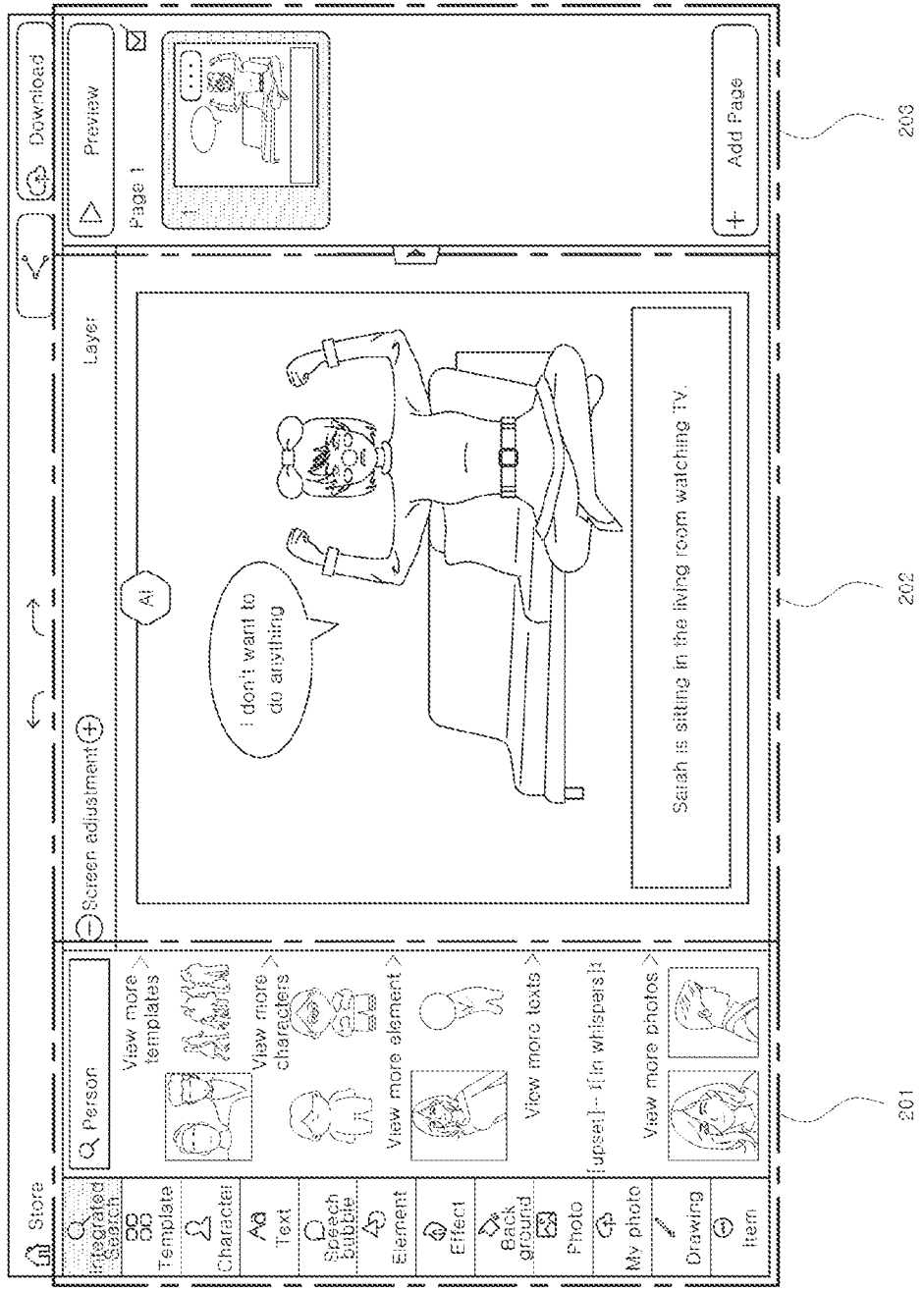

FIGS. 2A to 2C are exemplary diagrams illustrating an operation performed by the processor 130 of the device for automatically creating a cartoon image based on an input sentence according to the present disclosure.

Referring to FIG. 2A, the processor 130 may provide a user with a UI provided by the website or application through a user terminal (not shown).

The UI may include a first area 201 in which a plurality of icons having a plurality of functions are located, a second area 202 in which the cartoon image is displayed, and a third area 203 in which a page preview of the cartoon image and a preview icon are located to sequentially view the cartoon image.

When a user inputs the AI button displayed on the UI, the processor 130 may switch the screen of FIG. 2A to the screen of FIG. 2B.

Referring to FIG. 2B, when two sentences are input, the processor 130 may recognize the two sentences (for example, first sentence: Sarah is sitting in the living room watching TV. Second sentence: "I don't want to do anything"), and identify each of at least one word included in the two sentences.

In other words, the at least one word may be classified into a person, a place, an element, an effect, and a time, and the processor 130 may create a cartoon image based on the classified word.

In addition, the processor 130 may determine the two sentences as one of a general expression sentence, a dialogue expression sentence, and an emotional expression sentence based on the type of the identified punctuation mark.

Specifically, the processor 130 may determine the first sentence as the general expression sentence because a period of the punctuation mark of the first sentence is located at the end point.

In addition, when the type of the punctuation mark of the second sentence is double quotation marks, the processor 130 may determine the second sentence as the dialogue expression sentence.

Referring to FIG. 2C, when the first sentence is the general expression sentence, the processor 130 may automatically create a cartoon image based on a word included in the general expression sentence.

The cartoon image may include at least one character having at least one theme.

In addition, when the second sentence is the dialogue expression sentence, the processor 130 may understand the subject of the second sentence which is the dialogue expression sentence.

The subject of the second sentence may be understood as 'Sarah', who is the subject of the first sentence.

Accordingly, the processor 130 may insert the second sentence, which is the dialogue expression sentence, in the form of a speech bubble on the character of 'Sera' corresponding to the understood subject among at least one character in the cartoon image.

FIGS. 3A to 3L are diagrams illustrating a UI that automatically creates and provides a cartoon image based on an input sentence according to the present disclosure.

Figure 3A:
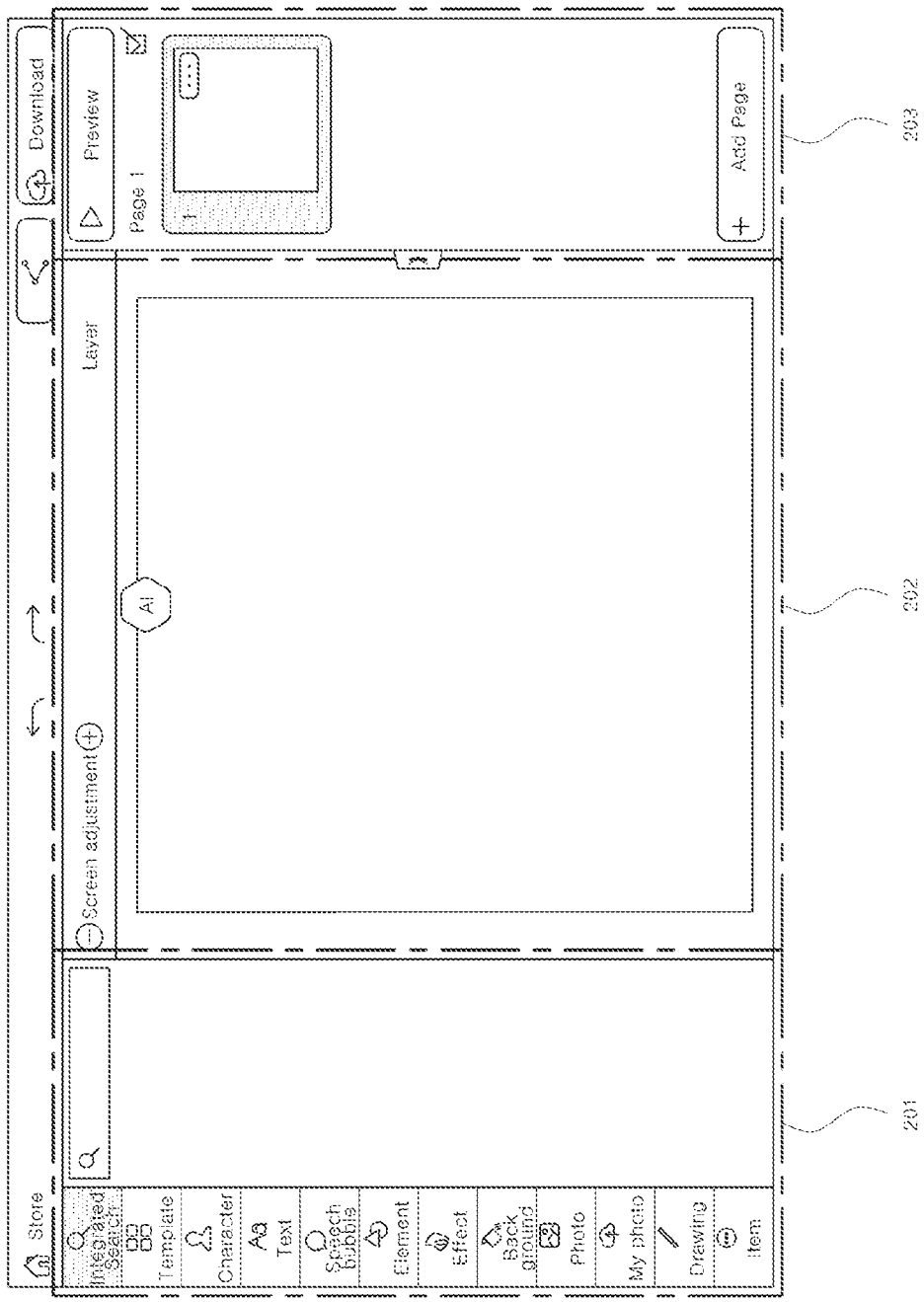
FIGS. 3A to 3L are diagrams illustrating a UI that automatically creates and provides a cartoon image based on an input sentence according to the present disclosure.

Referring to FIG. 3A, the UI may include a first area 201 in which a plurality of icons having a plurality of functions are located, a second area 202 in which the cartoon image is displayed, and a third area 203 in which a page preview of the cartoon image and a preview icon are located to sequentially view the cartoon image.

The first area 201 may include an integrated search icon, a template icon, a character icon, a text icon, a speech bubble icon, an element icon, an effect icon, a background icon, a photo icon, a my photo icon, a drawing icon, and an item icon.

Figure 3B:
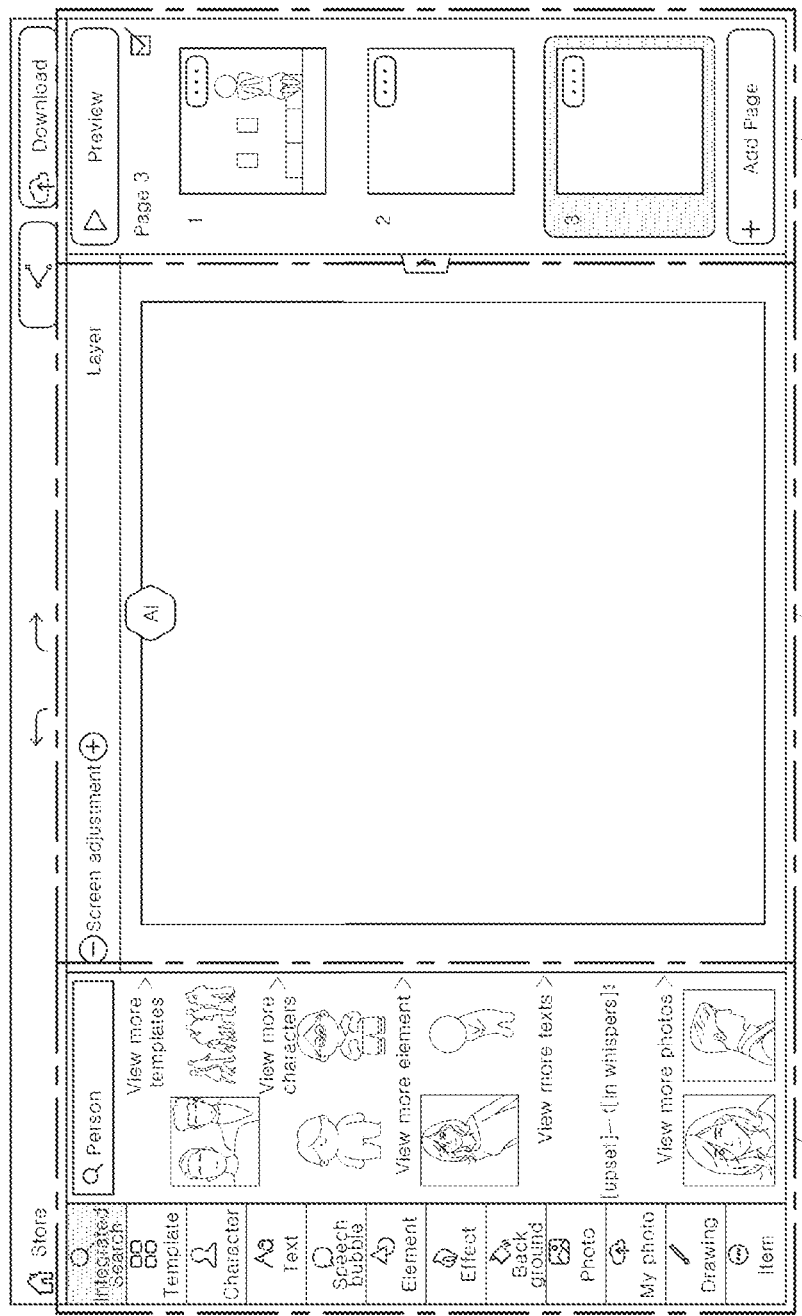

Referring to FIG. 3B, when the integrated search icon is input by the user and the word 'person' is input by the user, the processor 130 may display sample information for a plurality of icons for the word 'person.'

Figure 3C:
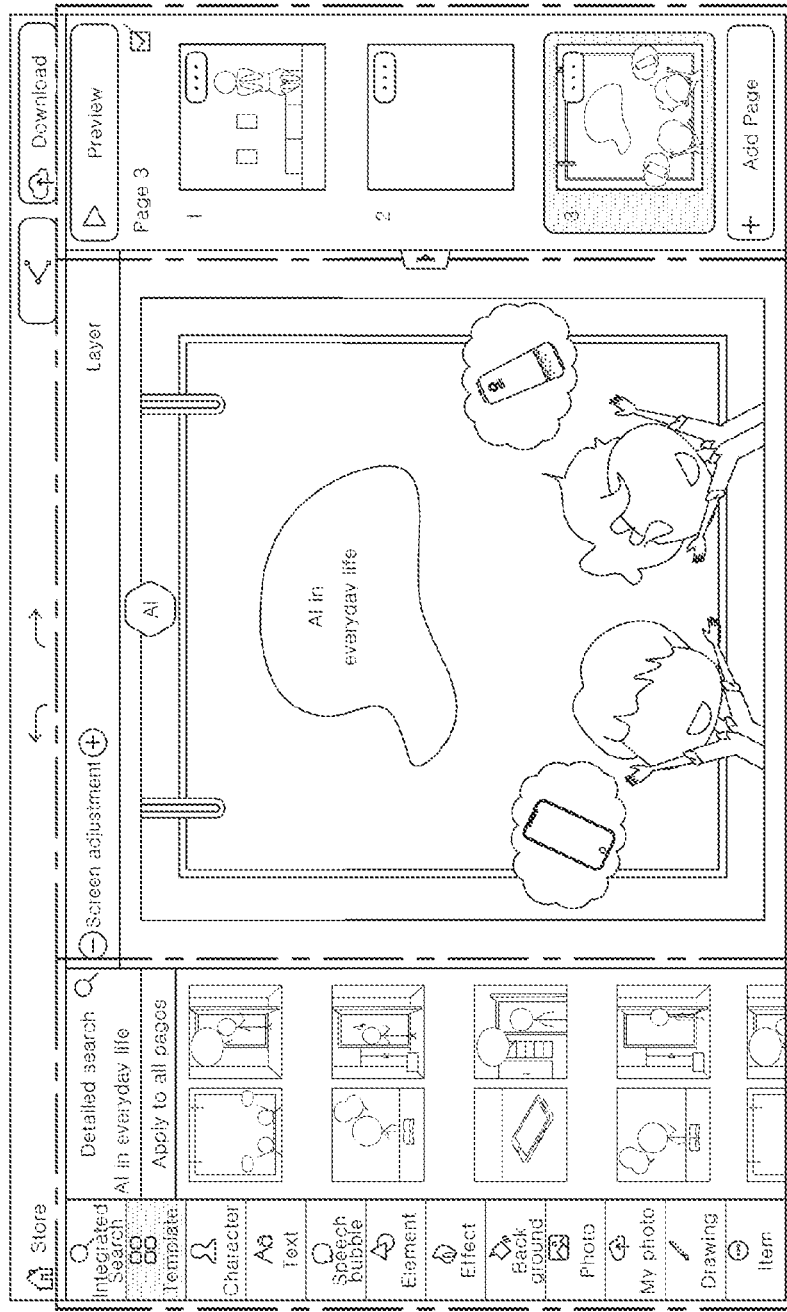

Referring to FIG. 3C, when the template icon is input by the user, the processor 130 may display information on at least one or more pre-stored sample templates in the first area 201 and receive a specific sample template from the user. In this case, the specific sample template may be displayed on the first area 201 and the second area 202.

Specifically, in the first area 201, at least one sample cartoon image included in the specific sample template may be displayed in a preview format, and in the second area 202, a sample cartoon image selected from among the specific sample templates may be displayed on the second area 202.

The pre-stored sample template may be in the form of a template in which content, font, background, and color are all editable.

In addition, when receiving a search word for the sample template information through a detailed search from the user in the first area 201, the processor 130 may extract at least one piece of sample template information matching the search word into the memory 120 and display the extracted information on the first area 201.

Figure 3D:
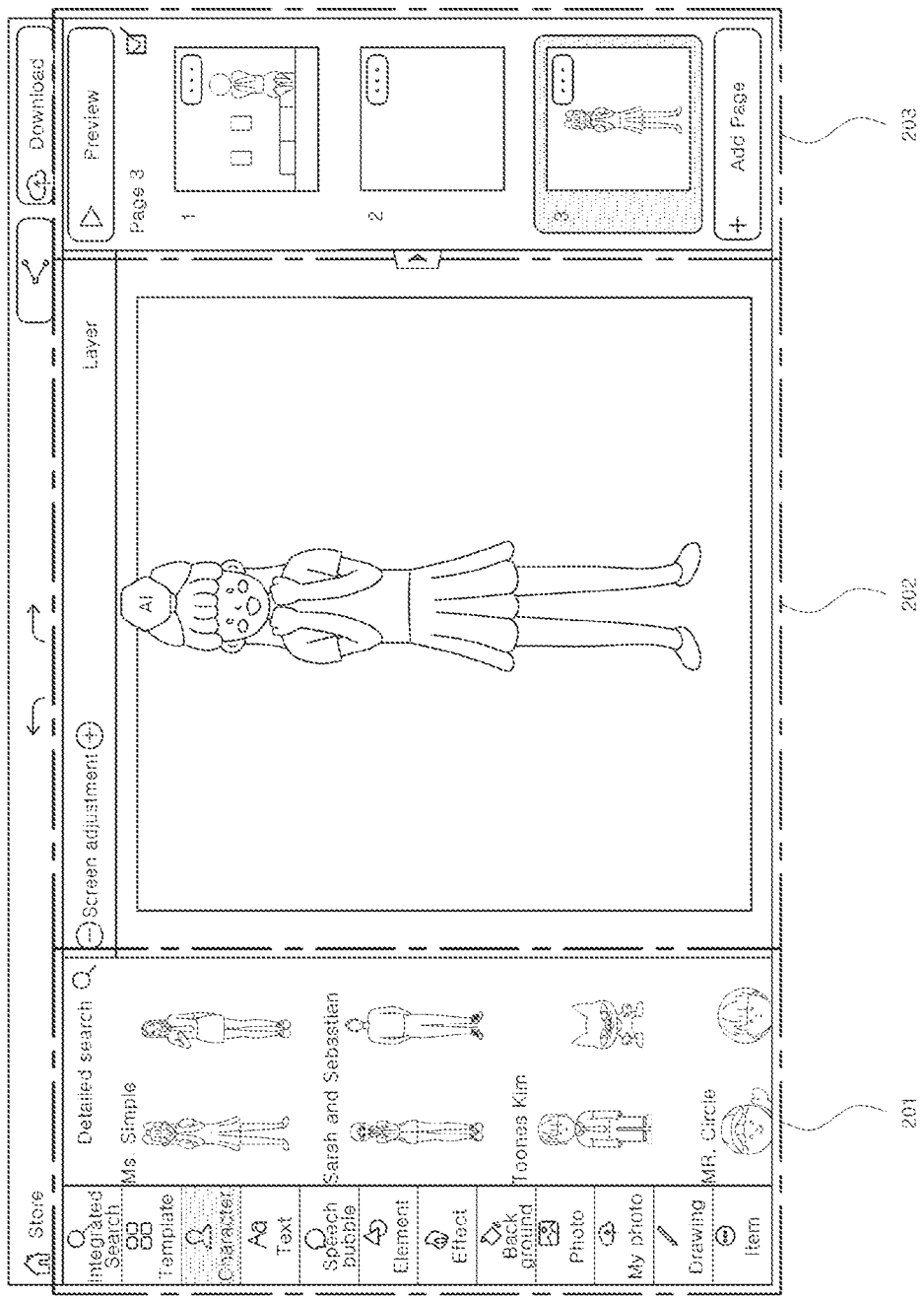

Referring to FIG. 3D, when the character icon is input by the user, the processor 130 may display at least one or more pre-stored character information on the first area 201, and when receiving a specific character input from the user, the specific character may be displayed on the second area 202.

When receiving a search word for the character through a detailed search from the user in the first area 201, the processor 130 may extract at least one character matching the search word into the memory 120 and display the extracted character on the first area 201.

Figure 3E:
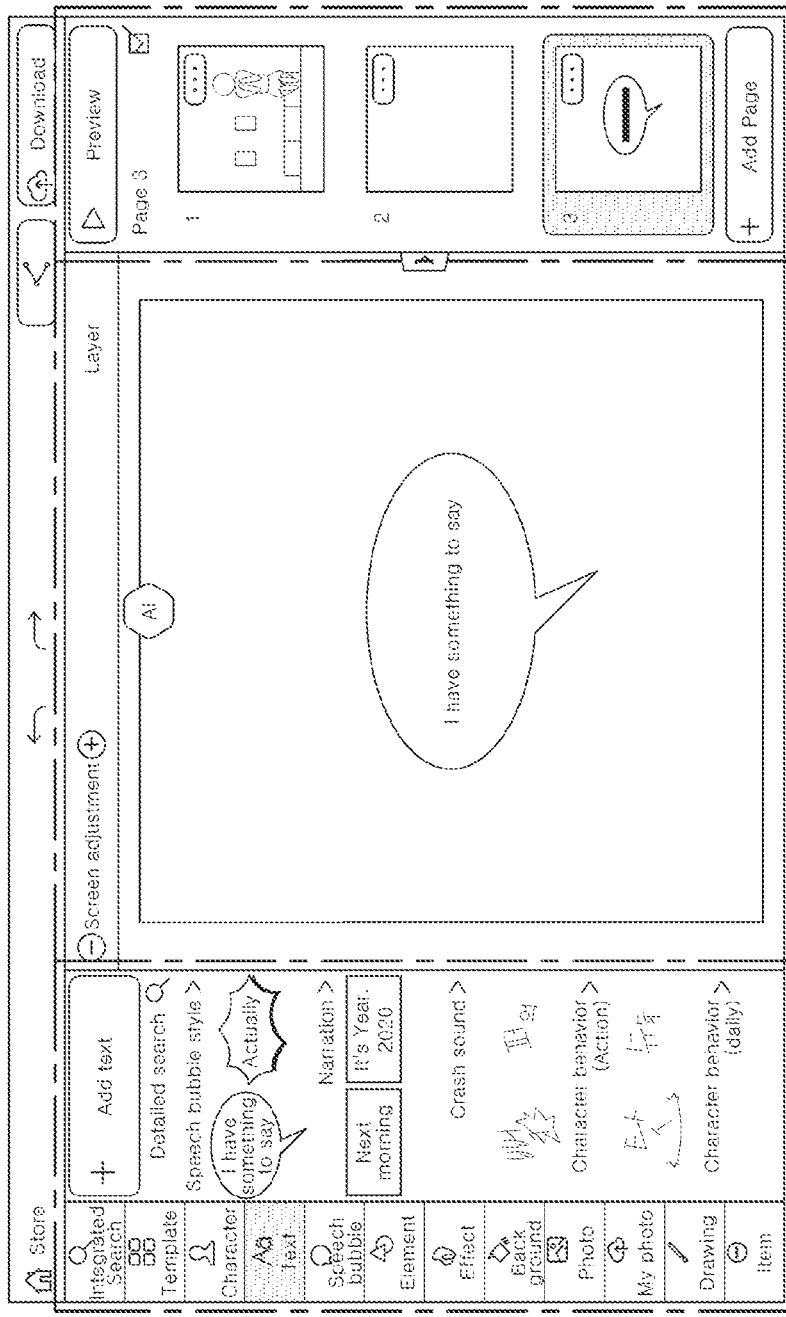

Referring to FIG. 3E, when the text icon is input by the user, the processor 130 may display at least one or more pre-stored text shape information on the first area 201. When a specific text shape input by the user is received, the specific text shape may be displayed on the second area 202.

When receiving a search word for the text shape information through a detailed search from the user in the first area 201, the processor 130 may extract at least one piece of text shape information matching the search word into the memory 120 and display the extracted information on the first area 201.

Figure 3F:
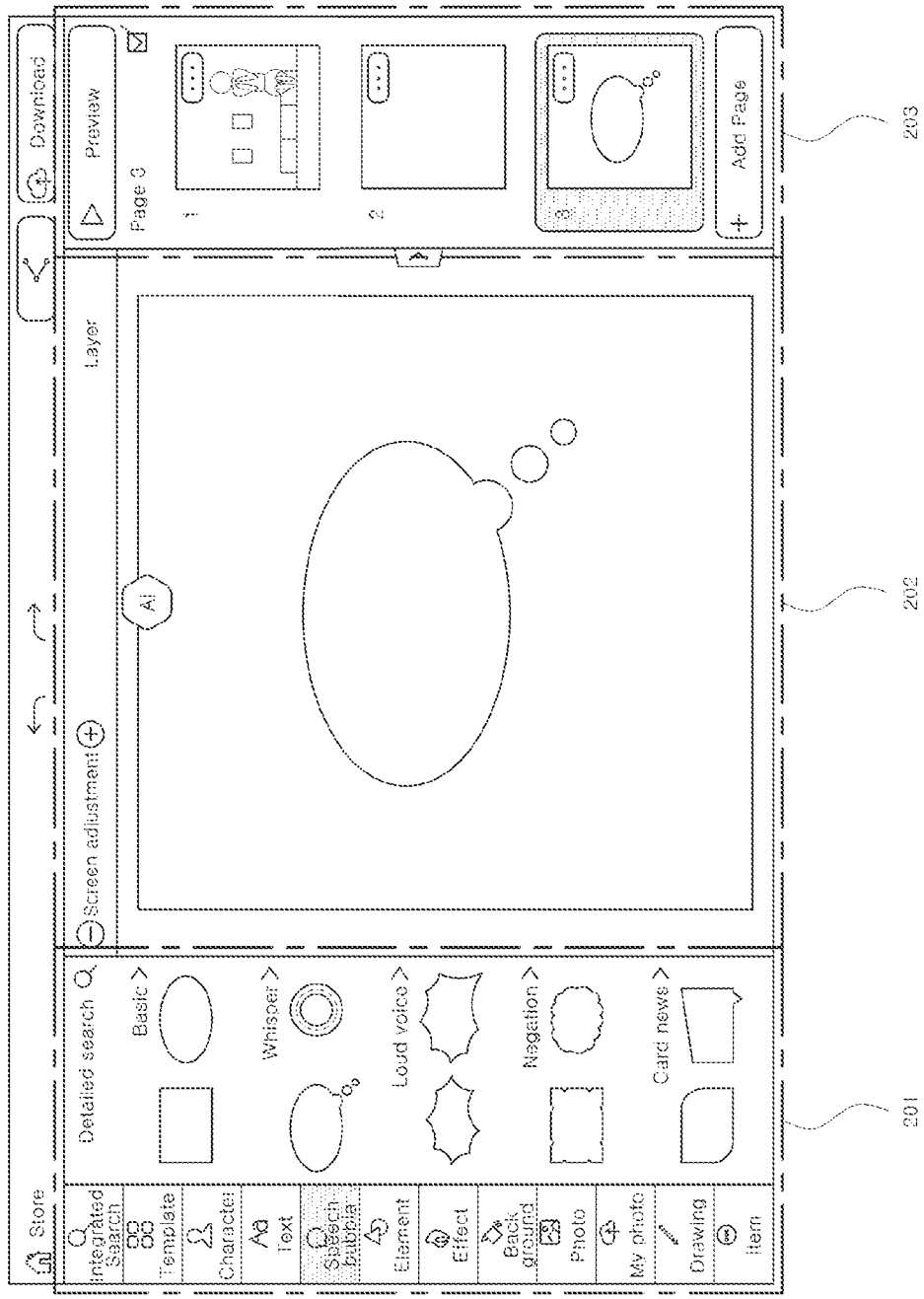

Referring to FIG. 3F, when the speech bubble icon is input, the processor 130 may display at least one piece of pre-stored speech bubble information on the first area 201. When a specific speech bubble from the user is received, the specific speech bubble may be displayed on the second area 202.

The processor 130 may receive and display a specific character, an emoticon, a sentence, and an image in the specific speech bubble from the user.

In addition, when receiving a search word for the speech bubble information through a detailed search from the user in the first area 201, the processor 130 may extract at least one piece of speech bubble information matching the search word into the memory 120 and display the extracted information on the first area 201.

Figure 3G:
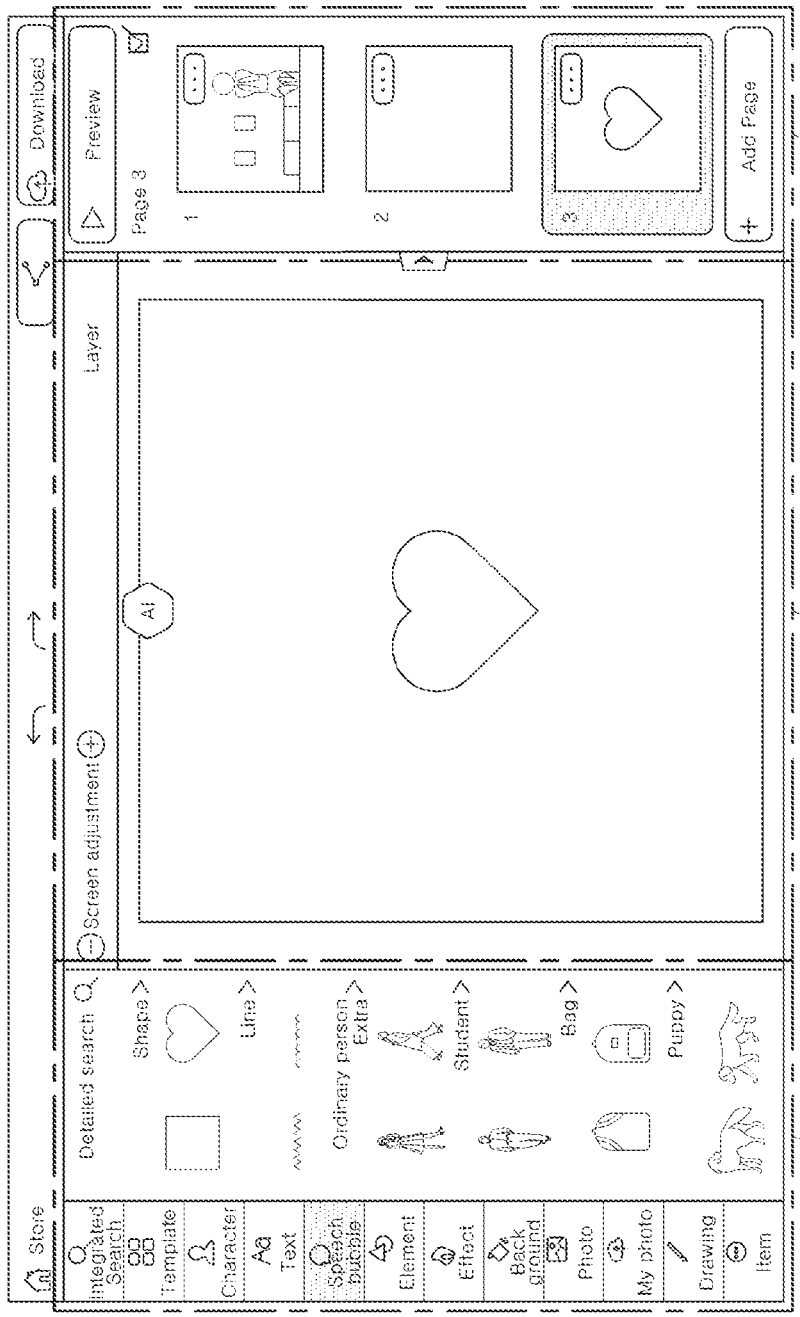

Referring to FIG. 3G, when the element icon is input, the processor 130 may display at least one piece of pre-stored element information on the first area 201. When a specific element is received from the user, the specific element may be displayed on the second area 202.

The processor 130 may change and display a size, color, and location of the specific element displayed on the second area 202 according to the user's input.

In addition, when receiving a search word for the element information through a detailed search from the user in the first area 201, the processor 130 may extract at least one piece of element information matching the search word into the memory 120 and display the extracted information on the first area 201.

Figure 3H:
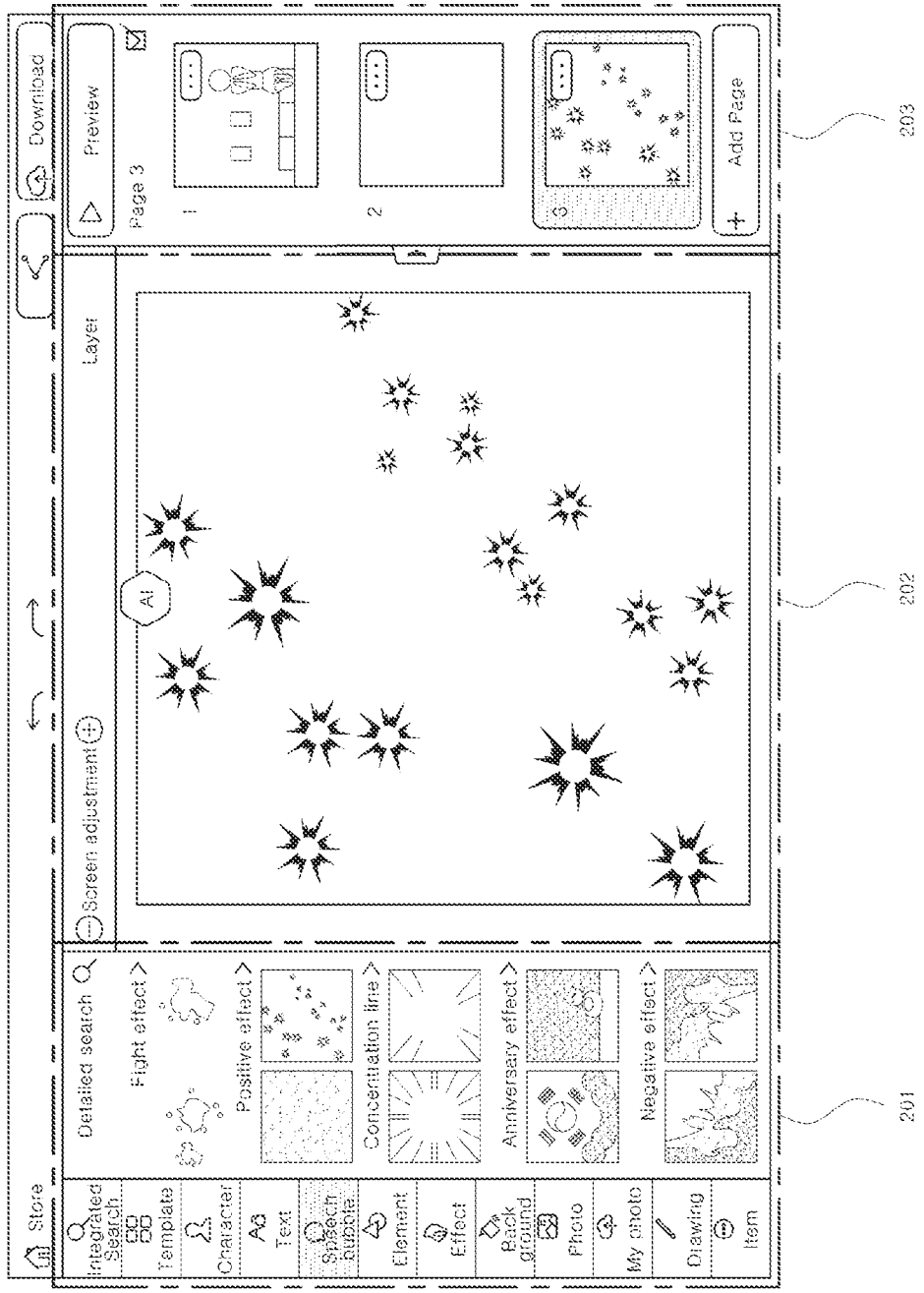

Referring to FIG. 3H, when the effect icon is input, the processor 130 may display at least one piece of pre-stored element information on the first area 201. When a specific effect is received from the user, the specific effect may be displayed on the second area 202.

The processor 130 may change and display a size, color, and location of the specific effect displayed on the second area 202 according to the user's input.

In addition, when receiving a search word for the effect information through a detailed search from the user in the first area 201, the processor 130 may extract at least one piece of effect information matching the search word into the memory 120 and display the extracted information on the first area 201.

Figure 3I:
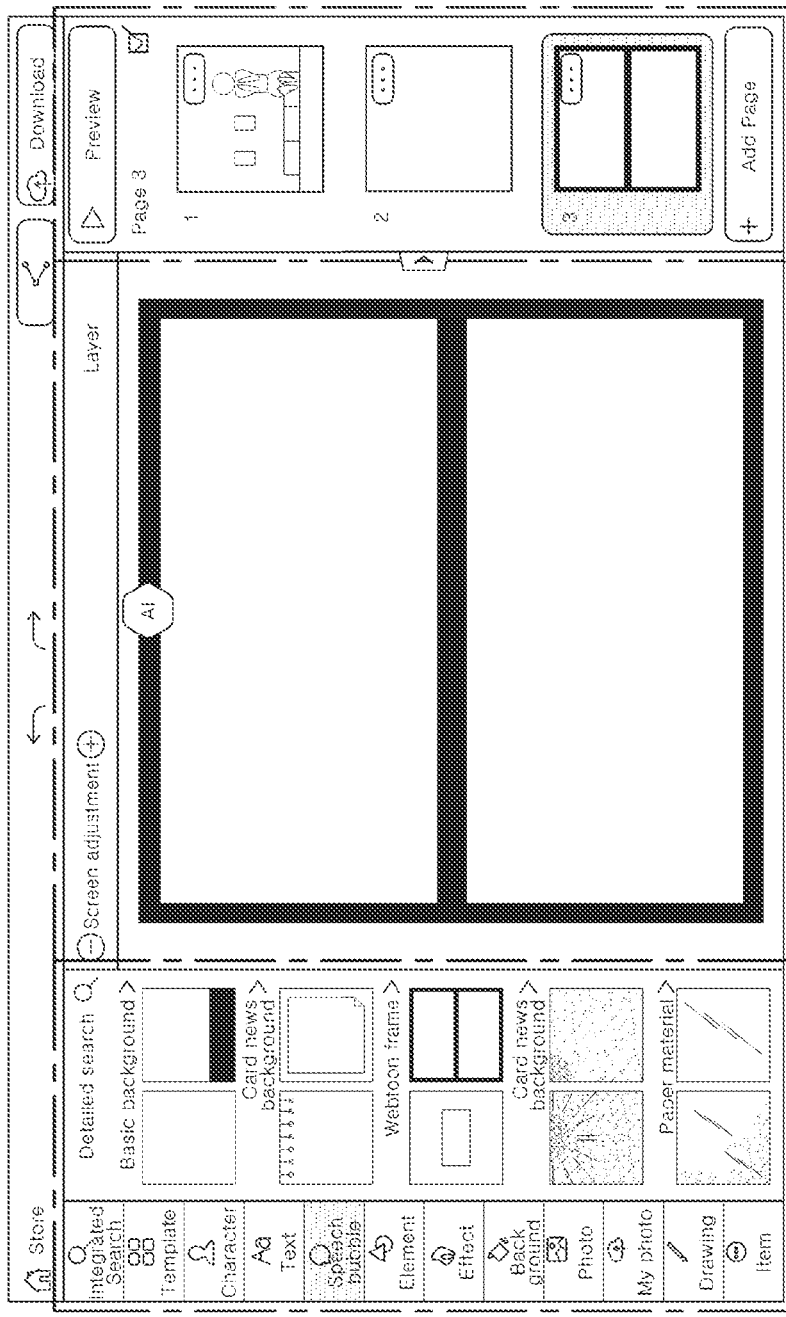

Referring to FIG. 3I, when the background icon is input, the processor 130 may display at least one piece of pre-stored background information on the first area 201. When a specific background is received from the user, the specific background may be displayed on the second area 202.

When receiving a search word for the background information through a detailed search from the user in the first area 201, the processor 130 may extract at least one piece of background information matching the search word into the memory 120 and display the extracted information on the first area 201.

Figure 3J:
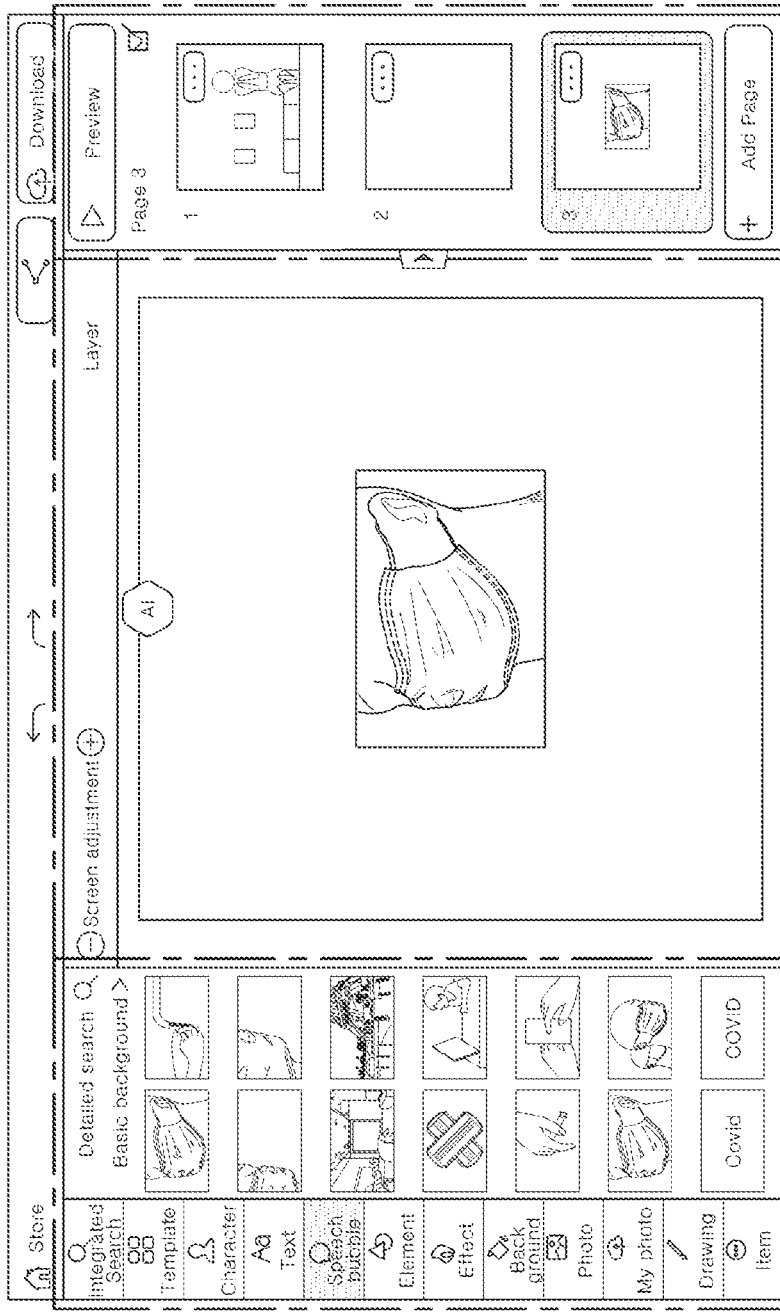

Referring to FIG. 3J, when the photo icon is input, the processor 130 may display at least one piece of pre-stored photo information on the first area 201. When a specific photo is received from the user, the specific photo may be displayed on the second area 202.

When receiving a search word for the photo information through a detailed search from the user in the first area 201, the processor 130 may extract at least one piece of photo information matching the search word into the memory 120 and display the extracted information on the first area 201.

Figure 3K:
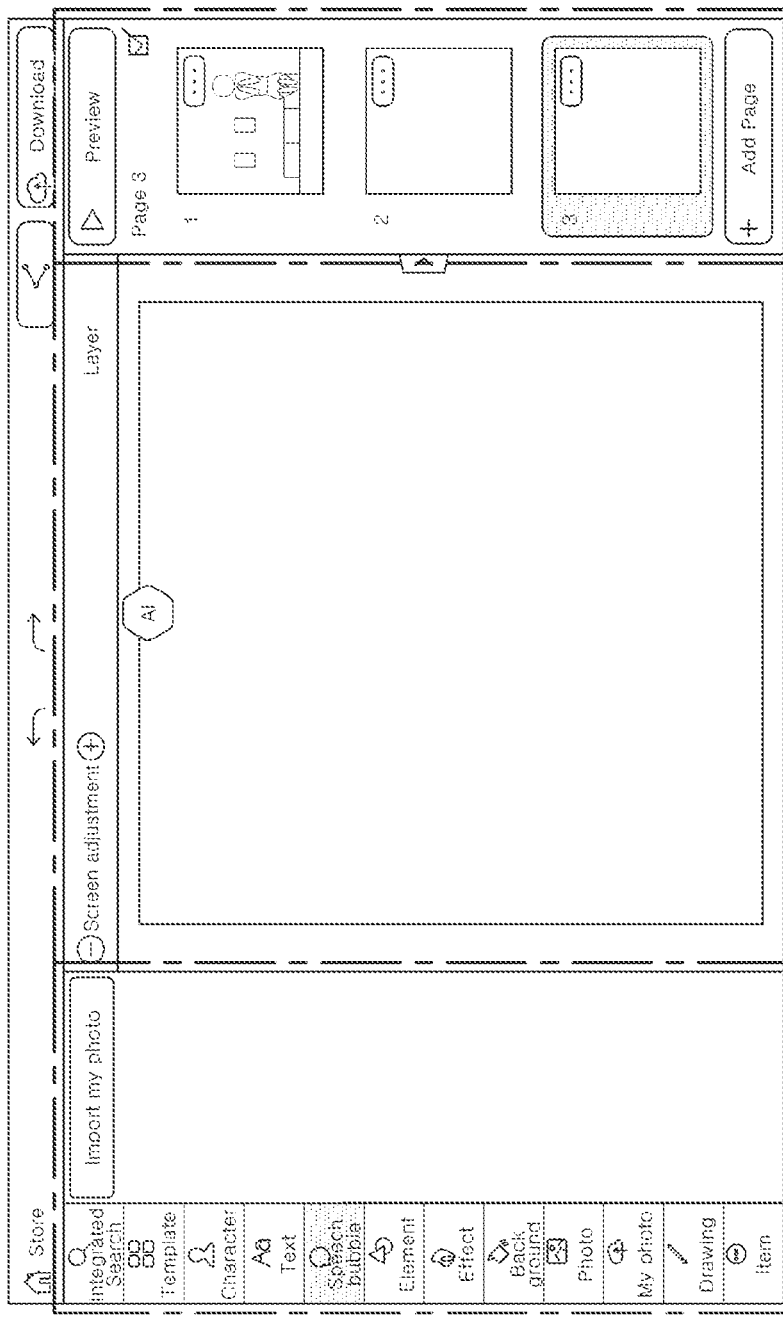

Referring to FIG. 3K, when the my photo icon is input, the processor 130 may display at least one piece of pre-stored my photo information on the first area 201. When a specific my photo is received from the user, the specific my photo may be displayed on the second area 202.

Figure 3L:
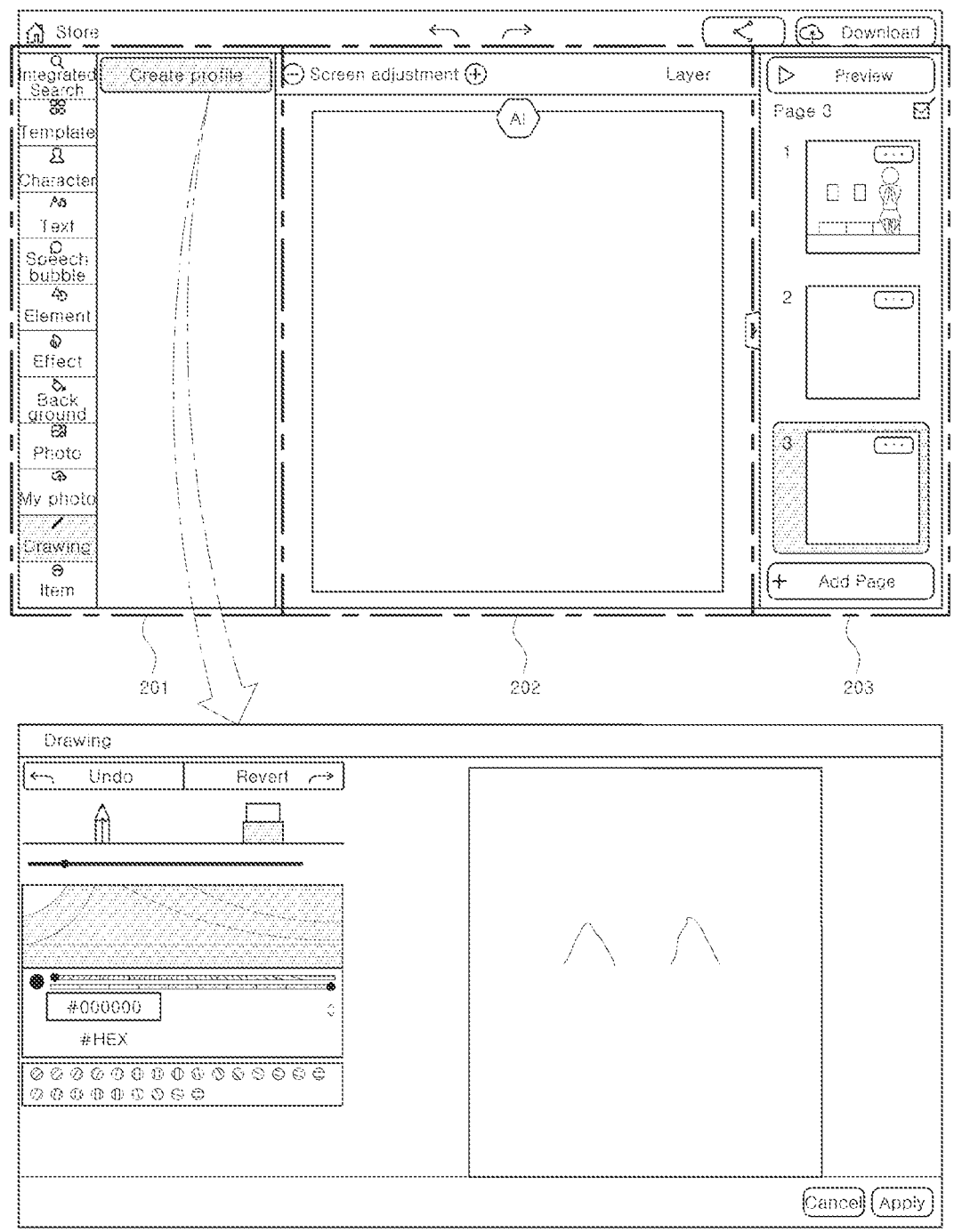

Referring to FIG. 3L, when the drawing icon is input, the processor 130 may display at least one piece of pre-stored drawing information on the first area 201. When a specific drawing tool is received from the user, details of the drawing tool (for example, pen thickness, pen color, pen type, and eraser size) may be displayed on a new screen.

When the processor 130 receives a detailed setting of the drawing tool from the user on the new screen, the processor 130 may display the input content input by the user based on the drawing tool for which the setting has been completed on the second area 202 in real time.

As described above, the processor 130 may correct the sentence-based cartoon image input by the user through the UI illustrated in FIGS. 3A to 3L in a desired direction according to the user's input.

In addition, the processor 130 may create and provide a higher quality cartoon image by automatically collectively correcting the cartoon image through the UI without the user's input.

Such correction may be preset through the UI before creating the cartoon image, or may be performed during the creation of the cartoon image.

Figure 4:
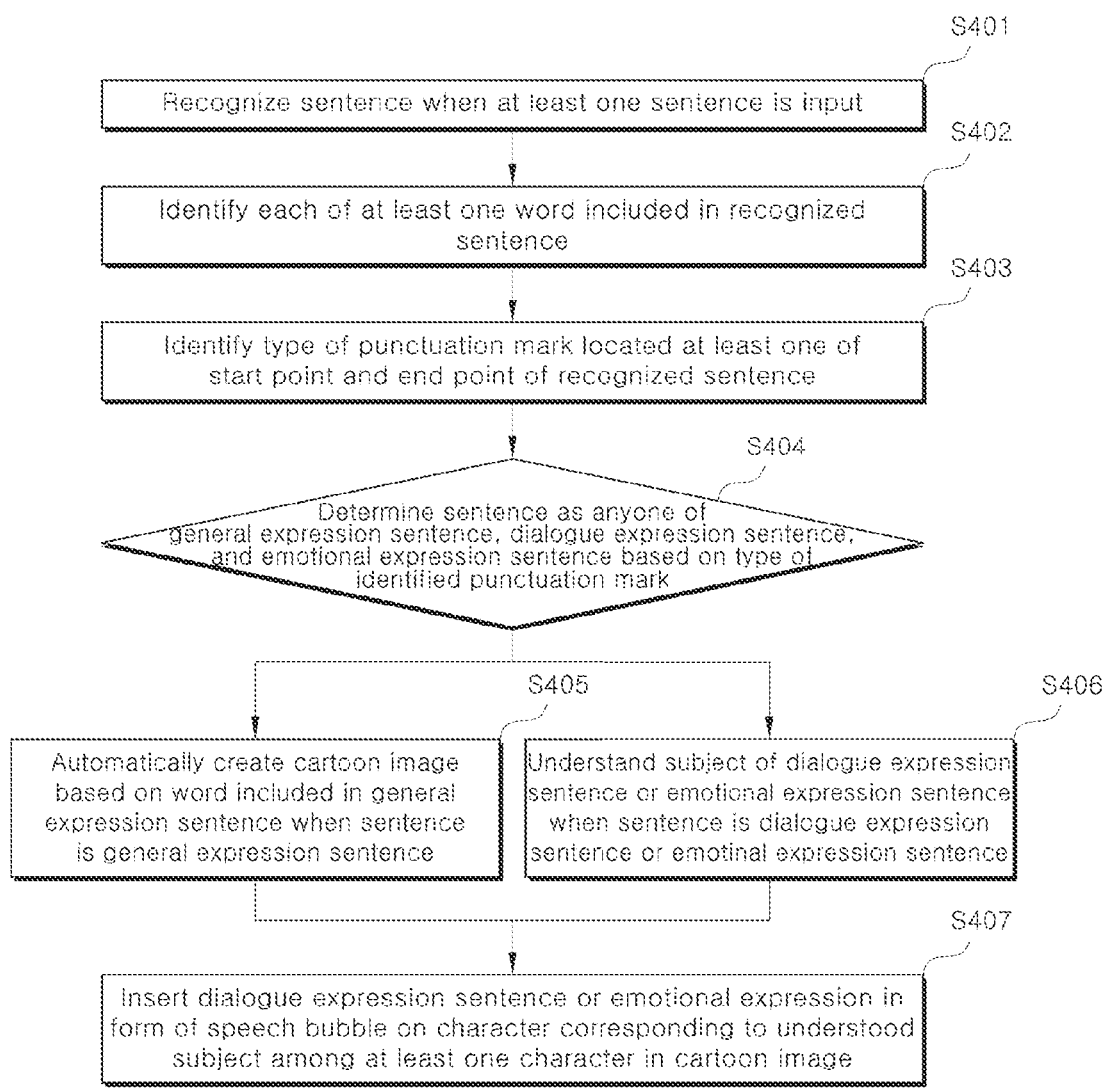
FIG. 4 is a flowchart illustrating a process of automatically creating a cartoon image based on an input sentence according to the present disclosure.

FIG. 4 is a flowchart illustrating a process of automatically creating a cartoon image based on an input sentence according to the present disclosure. Hereinafter, the operation of the processor 130 may be performed by the device 10.

When at least one sentence is input, the processor 130 may recognize the sentence (S401).

Specifically, the processor 130 may recognize the sentence when at least one sentence is input through a UI of a website or application that provides a service for automatically creating a cartoon image based on an input sentence.

When the at least one sentence is a plurality of sentences, the processor 130 may identify each of the words included in each of the plurality of sentences, and understand a sentence component of each of the identified words.

In addition, the processor 130 may group the plurality of sentences into at least one paragraph by determining the correlation between the plurality of sentences based on the understood sentence components.

Accordingly, the processor 130 may automatically group the paragraph based on the sentence components even when a plurality of sentences such as article contents or book contents are input through the UI, thereby easily converting contents incomprehensible into sentences into cartoon images to be provided to a user.

The processor 130 may identify each of at least one word included in the recognized sentence (S402).

In other words, the at least one word may be classified into a person, a place, an element, an effect, and a time, and the processor 130 may create a cartoon image based on the classified word.

The processor 130 may identify a type of punctuation mark located at least one of a start point and an end point of the recognized sentence (S403).

For example, the processor 130 may identify double quotation marks or single quotation marks located at a start point and an end point of the recognized sentence, and identify at least one of a period, an exclamation point, a question mark, and an ellipsis, located at the end point of the recognized sentence.

In addition, when the at least one sentence is a plurality of sentences, the processor 130 may identify a type of punctuation mark located at least one of a start point and an end point of at least one sentence included in the grouped paragraph.

The processor 130 may determine the sentence as any one of a general expression sentence, a dialogue expression sentence, and an emotional expression sentence based on the type of the identified punctuation mark (S404).

Specifically, when the identified punctuation mark is located only at an end point, the processor 130 may determine the recognized sentence as the general expression sentence.

In addition, when the type of the identified punctuation mark is double quotation marks, the processor 130 may determine the recognized sentence as the dialogue expression sentence. When the type of the identified punctuation mark is single quotation marks, the recognized sentence may be determined to be an emotional expression sentence.

In addition, when the identified punctuation mark is located at an end point and the type of the identified punctuation mark is any one of an exclamation mark and a question mark, the processor 130 may determine the recognized sentence as an emotional expression sentence.

In addition, when a preset emoticon or abbreviation is located in the recognized sentence, the processor 130 may determine the recognized sentence as an emotional expression sentence.

In addition, when the at least one sentence is a plurality of sentences, the processor may extract a specific sentence in which the subject is changed among the sentence components in the at least one sentence, or a specific sentence in which at least one of a predicate, an adjective, and an adverb among the sentence components includes an opposite word based on an artificial intelligence model for at least one sentence included last among the grouped paragraph.

The processor 130 may create the extracted specific sentence as the last cartoon image.

Accordingly, the processor 130 may create the last cartoon image among at least one or more cartoon images as the specific sentence, thereby having a reversal and adding curiosity about the subsequent cartoon.

When the sentence is the general expression sentence, the processor 130 may automatically create a cartoon image based on a word included in the general expression sentence (S405).

The cartoon image may include at least one character having at least one theme.

Specifically, when the word represents any one of a subject, an object, and a complement, the processor 130 may create the character having a theme corresponding to the word.

In addition, when the word represents a place, the processor 130 may create a background of the cartoon image based on the word.

In addition, when the word represents time, the processor 130 may determine the brightness of the cartoon image based on the word.

In addition, the processor 130 may determine a verb related to the created character in a general expression sentence, and create the character to represent a motion corresponding to the determined verb.

In addition, the processor 130 may determine the size and location of the created character and the size and location of the speech bubble based on the object arrangement algorithm.

When the user's manipulation information for the cartoon image is input, the object arrangement algorithm may build a learning data set by matching the manipulation information with the cartoon image, and be machine learned based on the built learning data set.

Accordingly, the processor 130 may apply the object arrangement algorithm to each user.

In addition, the processor 130 may build a learning data set of the object arrangement algorithm according to the user's needs by matching the manipulation information with the cartoon image, so that due to the accumulation of the data set, a cartoon image in a direction desired by the user may be directly created in the future.

The manipulation information may include at least one of first information, second information, third information, and fourth information.

The first information is information about the size and location change of the character, left-right inversion, and up-and-down inversion, the second information is information about the change in the expression of the character and the change in the motion of the character, the third information is information about the addition or deletion of the character or the object and the change of the background, and the fourth information is information may be information about the change of the perspective of the character or the object.

In addition, the processor 130 may understand a subject for an emotional expression sentence and display the face of the character corresponding to the understood subject by zooming in at a preset magnification or by changing the shape of the face.

For example, the processor 130 may change the shape of the face to be slightly or wide smile depending on the degree of happy emotion, or change the degree of frown face according to the degree of bad emotion.

When the sentence is the dialogue expression sentence or the emotional expression sentence, the processor 130 may understand the subject of the dialogue expression sentence or the emotional expression sentence.

The processor 130 may insert the dialogue expression sentence or the emotional expression sentence in the form of a speech bubble on the character corresponding to the understood subject among at least one character in the cartoon image (S407).

FIG. 4 illustrates that operations S401 to S407 are sequentially executed, but this is merely illustrative of the technical idea of this embodiment. It is possible for those of ordinary skill in the technical field to which this embodiment belongs to apply various modifications and variations to executing by changing the order described in FIG. 4 or executing one or more of operations S401 to S407 in parallel within a range that does not deviate from the essential characteristics of this embodiment. FIG. 4 does not limit a time series sequence.

Hereinafter, a process in which the device 10 according to the present disclosure creates a dynamically variable character with respect to a character in the created cartoon image will be described.

The device 10 may create a joint-bridge in a blank area generated at a joint or a connection portion of the character.

Thereafter, the device 10 may display the created character by receiving the motion design of the character from the user through a website or an application.

The website or the application may provide a dynamically variable character creation service included in a service for automatically creating a cartoon image based on an input sentence.

Accordingly, the device 10 may create a joint-bridge for each joint portion of the character for connecting the joint portion of the character to have the effect of allowing the movement of the joint portion of the character naturally.

In addition, the device 10 may create a joint-bridge by rotating a portion of a character to create a joint-bridge at a preset angle, based on a rotation axis, thereby capable of expressing a character having a natural joint-bridge.

In addition, the device 10 may support access to a website to use the dynamically variable character creation service, or may support a self-produced application to support the dynamically variable character creation service.

Hereinafter, a detailed operation through the processor 130 of the device 10 will be described.

The processor 130 may separate the joint portion corresponding to the character selected from the user terminal (not shown) into a first element and a second element, and create and display central joint-bridge data connecting the first element and the second element in a straight line. The joint-bridge may be disposed to overlap a blank area between the first element and the second element of the character.

The processor 130 may create and display first-direction joint-bridge data connecting the first element and the second element of the character in a first direction or second-direction joint-bridge data connecting the first element and the second element of the character in a second direction.

In addition, the processor 130 may create and display the first-direction joint-bridge data and the second-direction joint-bridge data by rotating the character based on a rotation axis.

The processor 130 receives a selection of a first element motion design or a second element motion design corresponding to each of the central joint-bridge data, the first direction joint-bridge data, or the second-direction joint-bridge data from a user terminal (not shown), and match the character to the second element motion design.

The memory 120 may store a plurality of characters, a plurality of first element motion designs, and a plurality of second element motion designs.

The operation of the device 10 according to the present disclosure described above shares the same contents, differing only from the process of creating a dynamically variable character to be described with reference to FIGS. 5 to 18 and the category of the present disclosure. The details will be described later with reference to FIGS. 5 to 18.

The user terminal (not shown) may receive the motion design of the character from a user, display the character created by the device 10 and provide the character to the user.

The user may use the corresponding service by installing and running the application in the user terminal (not shown). The corresponding service may be a dynamically variable character creation service included in a service for automatically creating a cartoon image based on an input sentence.

Alternatively, the user may access the website through the user terminal (not shown) and use the corresponding service.

In addition, the user terminal (not shown) used by the user in an embodiment of the present disclosure is typically applicable to a computer, and anything that includes a display unit, an input unit, and a communication function, such as smartphones, tablet PCs, and laptops, may be applicable.

For example, the user terminal may (not shown) be any one of a digital device such as a cellular phone including a display unit, an input unit, and a communication function, a smart phone, a PDA, a PMP, a tablet PC, a personal computer (for example, a desktop computer, and a notebook computer), a workstation, a PDA, or a web pad.

Figure 5:
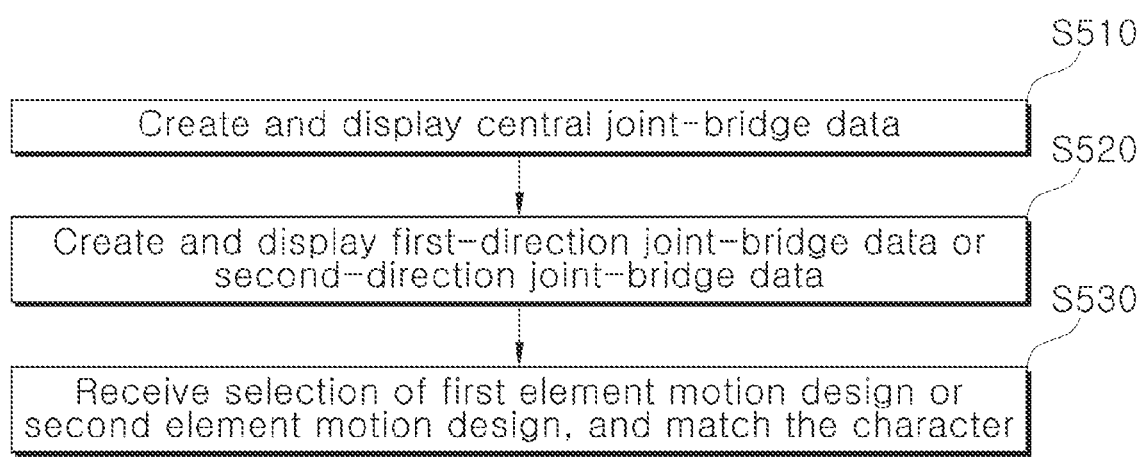
FIG. 5 is a flowchart illustrating a process of creating a dynamically variable character according to the present disclosure.

FIG. 5 is a flowchart illustrating a process of creating a dynamically variable character according to the present disclosure. Hereinafter, the operation of the processor 130 may be performed by the device 10.

The processor 130 may create and display central joint-bridge data connecting joint portions separated into a first element and a second element of a character selected from the user terminal (not shown) (S510).

Here, the first element may be an upper body of the character's body, upper arms of the arms, and a thigh of the legs, and the second element may be a lower body of the character's body, lower arms of the arms, and a calf of the legs.

In addition, the first element and the second element may include elements such as one end and the other end of clothing covering the skin and joint portion, one end and the other end of a button, and one end and the other end of a zipper, as well as the skin and joints corresponding to the first element and the second element.

Accordingly, the processor 130 may create the central joint-bridge data for the joint portions or the connection portions separated into the first element and the second element according to the movement of the character, thereby enabling natural movement of the character.

Details of creating the central joint-bridge data in operation S510 will be described with reference to FIGS. 6 to 9.

Figure 6:
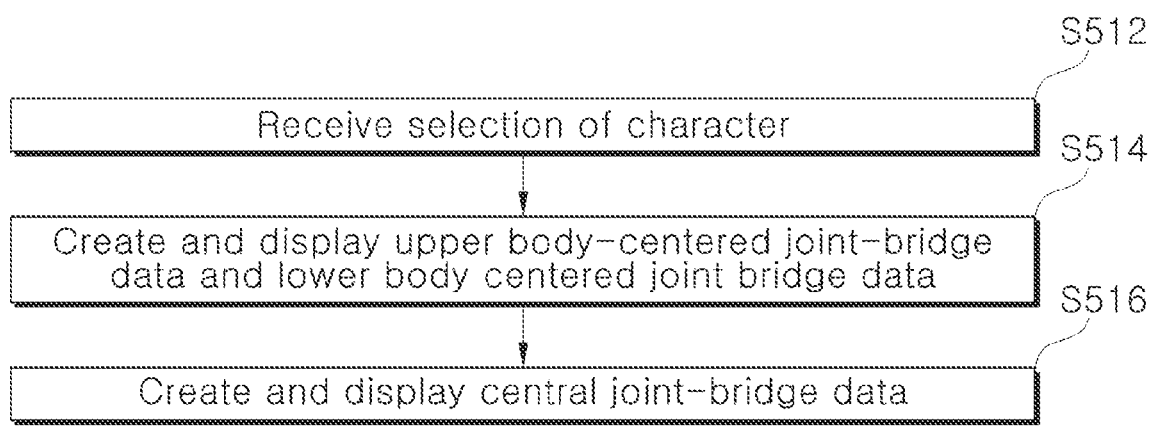
FIG. 6 is a flowchart illustrating a process of creating central joint-bridge data according to the present disclosure.

FIG. 6 is a flowchart illustrating a process of creating central joint-bridge data according to the present disclosure.

Figure 7:
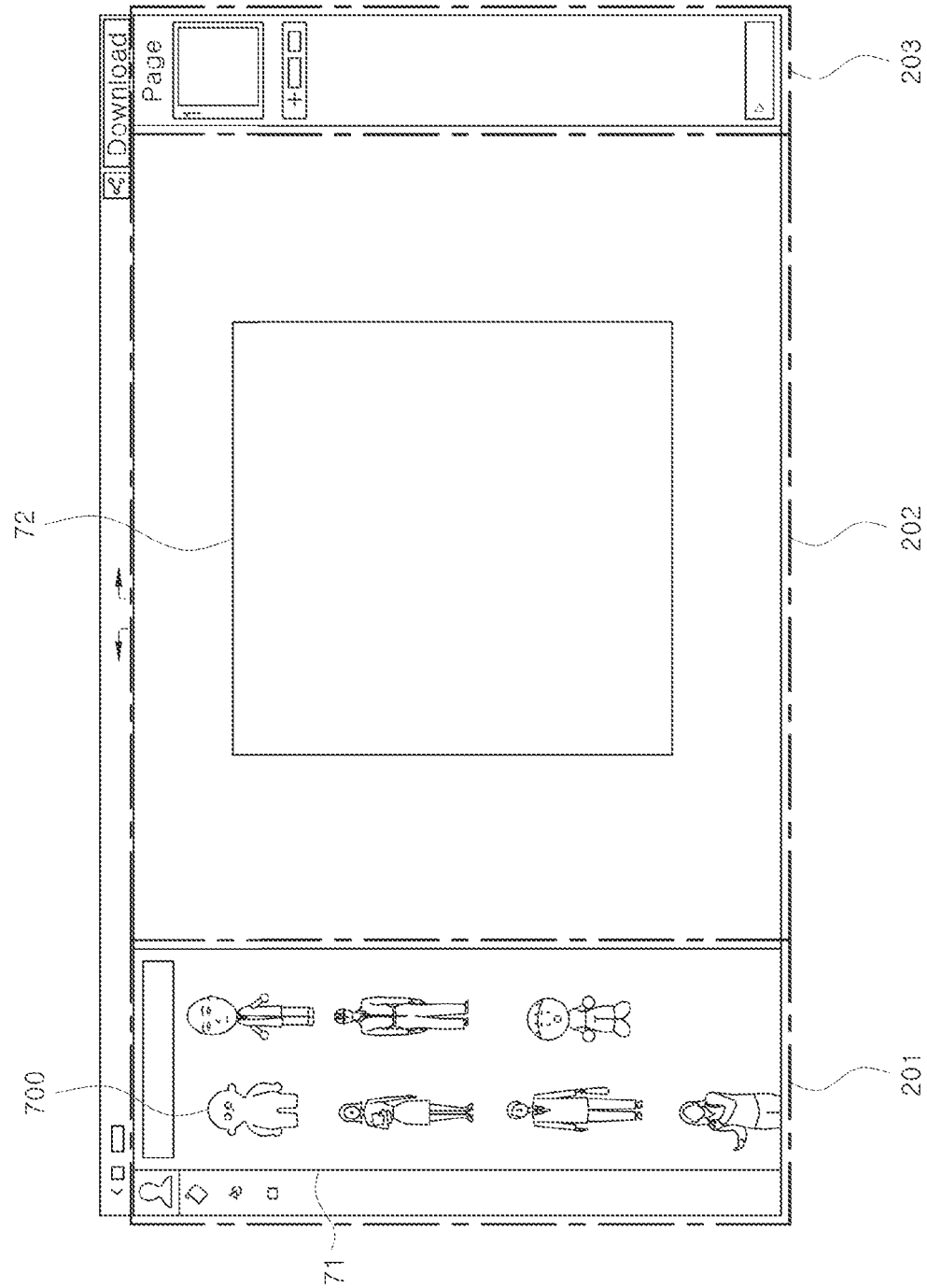
FIG. 7 is an exemplary diagram illustrating that a user selects a desired character from among a plurality of characters of a character creation service page according to the present disclosure.

FIG. 7 is an exemplary diagram illustrating that a user selects a desired character from among a plurality of characters of a character creation service page according to the present disclosure.

Figure 8:
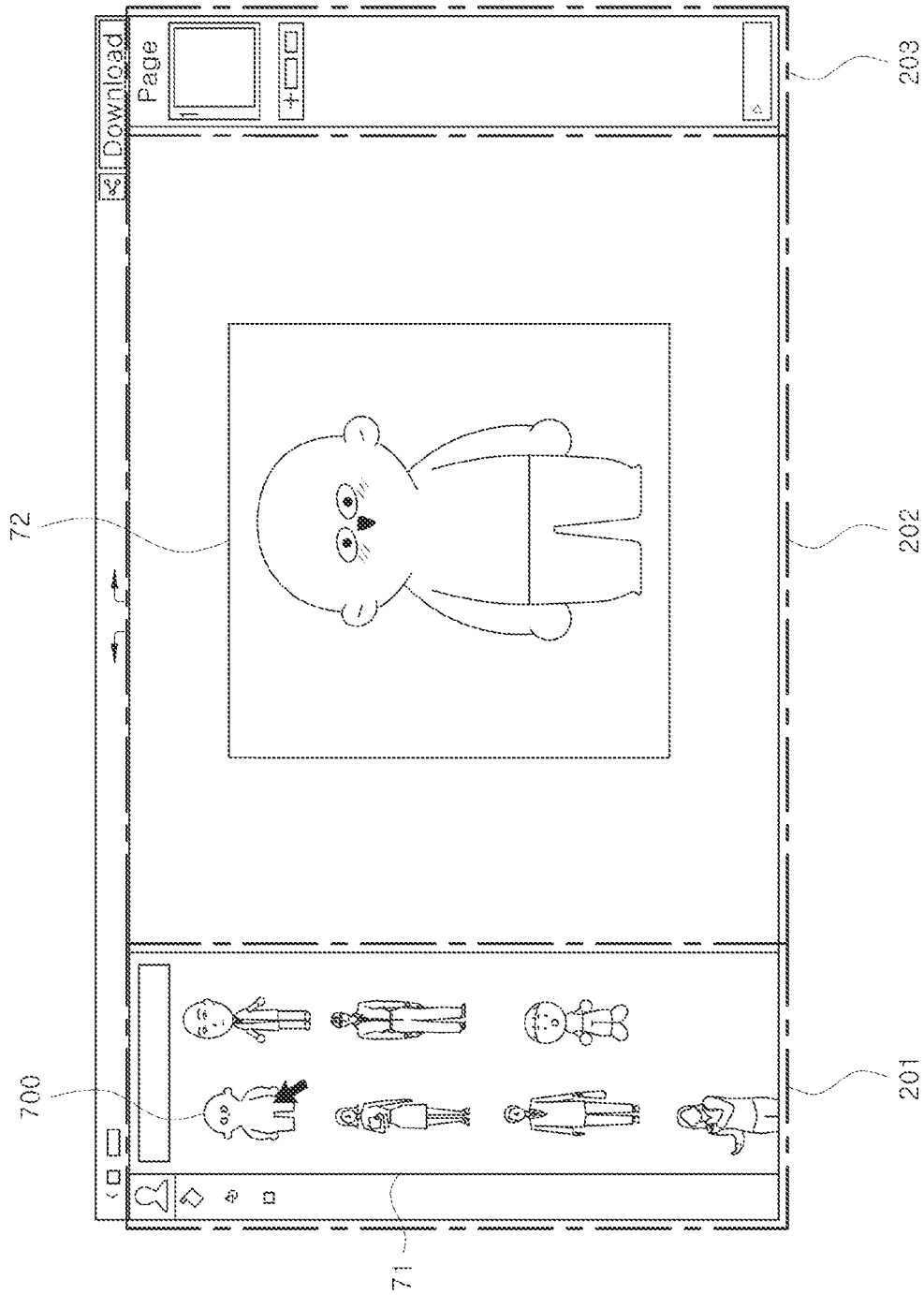
FIG. 8 is an exemplary diagram illustrating that a character selected by a user according to the present disclosure is shown on a character creation screen.

FIG. 8 is an exemplary diagram illustrating that a character selected by a user according to the present disclosure is shown on a character creation screen.

Figure 9:
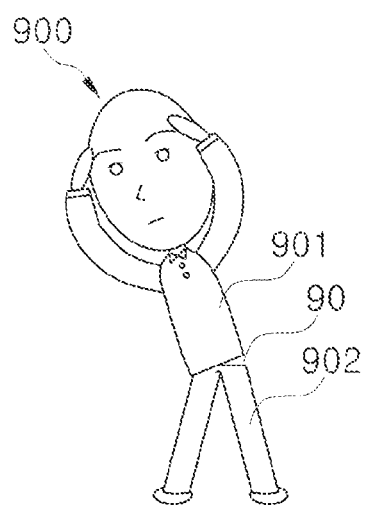
FIG. 9 is an exemplary view illustrating upper body-centered joint-bridge data and lower body-centered joint-bridge data of a character selected by a user according to the present disclosure.
Figure 9:
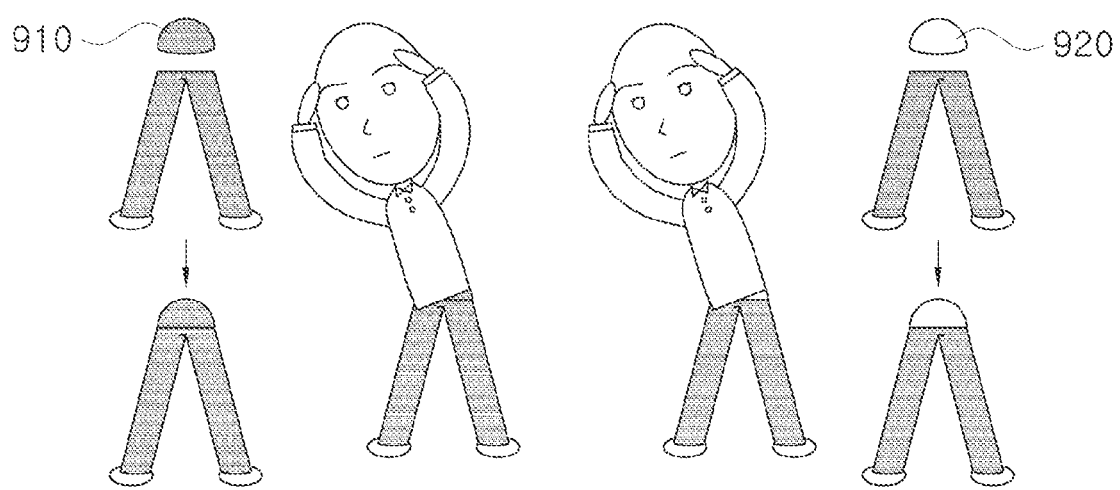

FIG. 9 is an exemplary view illustrating upper body-centered joint-bridge data and lower body-centered joint-bridge data of a character selected by a user according to the present disclosure.

Referring to FIG. 6, in creating the central joint-bridge data in operation S510, the processor 130 may receive a selection of one character from a user terminal (not shown) among a plurality of pre-stored characters (S512).

For example, referring to FIG. 7, when a character creation service application is driven in a user terminal (not shown), the processor 130 may activate a character creation service page as illustrated in FIG. 7 on the UI.

In the character creation service page, a plurality of characters may be provided in a character selection field 71 in the first area 201.

The user may select a first character 700 that is a desired character from among a plurality of characters through a user terminal (not shown).

Referring to FIG. 8, when the user selects the first character 700 through a user terminal (not shown), the processor 130 may display the first character 700 on an artboard 42, which is a character creation screen of the second area 202.

The processor 130 may create and display upper body-centered joint-bridge data corresponding to the upper body and lower body-centered joint-bridge data corresponding to the lower body for a body that is separated into the upper body, which is the first element, and the lower body, which is the second element, of the character (S514).

For example, referring to FIG. 9, the second character 900 selected by the user through a user terminal (not shown) may be displayed separately from an upper body that is a first element and a lower body that is a second element.

Accordingly, when the second character 900 tilts the upper body to the left as illustrated in FIG. 9, a blank 90 may be generated as the upper body is tilted.

When a blank is generated for a portion in which the joint of the second character 900 moves, the second character 900 may be displayed unnaturally. Therefore, in order to display the second character 900 naturally, a joint-bridge connecting the blank 90 may be required.

Referring to FIG. 9, the processor 130 may create and display the lower body-centered joint-bridge data 910 or the upper body-centered joint-bridge data 920 to connect the upper body, which is the first element, and the lower body, which is the second element, of the second character 900 selected through a user terminal (not shown).

The upper body-centered joint-bridge data 910 may express the waist portion in a top 901 of the second character 900 as a joint-bridge for the waist portion among the joint portions of the second character 900, so that the second character 900 may fill the blank 90 that may occur when the body is tilted in the left direction.

In addition, the lower body-centered joint-bridge data 920 may express bottoms 902 that rise up to the waist portion in the top 901 of the second character 900 as a joint-bridge for the waist portion among the joint portions of the second character 900, so that the second character 900 may fill the blank 90 that may occur when the body is tilted in the left direction.

The processor 130 may receive a selection of one of the upper body-centered joint-bridge data and the lower body-centered joint-bridge data from the user terminal (not shown) to create and display the central joint-bridge data (S516).

The processor 130 may create and display first-direction joint-bridge data connecting the first element and the second element of the character in a first direction or second-direction joint-bridge data connecting the first element and the second element of the character in a second direction (S520).

Details of creating and displaying the first-direction joint-bridge data or the second-direction joint-bridge data in operation S520 will be described with reference to FIGS. 10 to 15.

Figure 10:
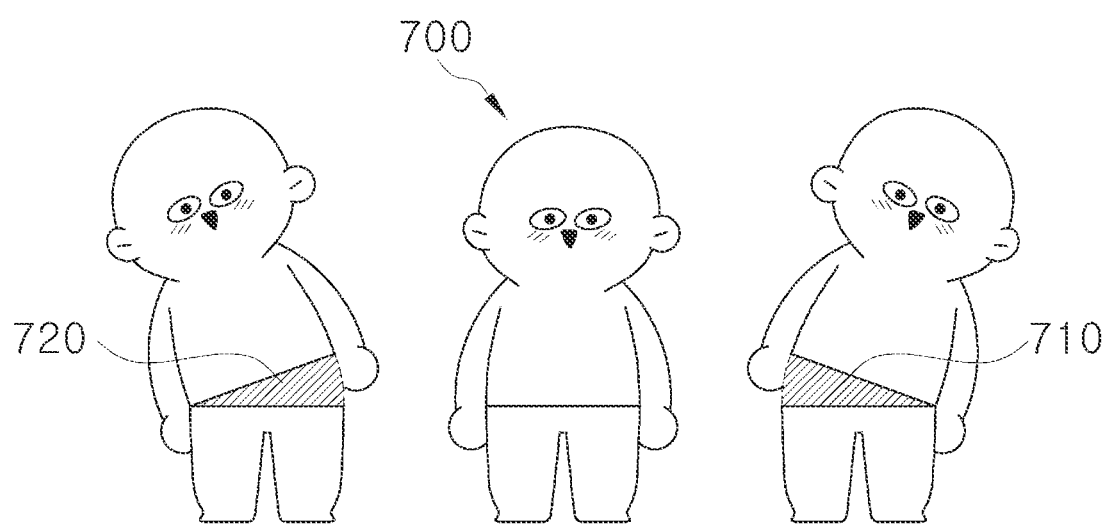
FIG. 10 is an exemplary diagram illustrating first-direction joint-bridge data and second-direction joint-bridge data according to the present disclosure.

FIG. 10 is an exemplary diagram illustrating first-direction joint-bridge data and second-direction joint-bridge data according to the present disclosure.

Figure 11:
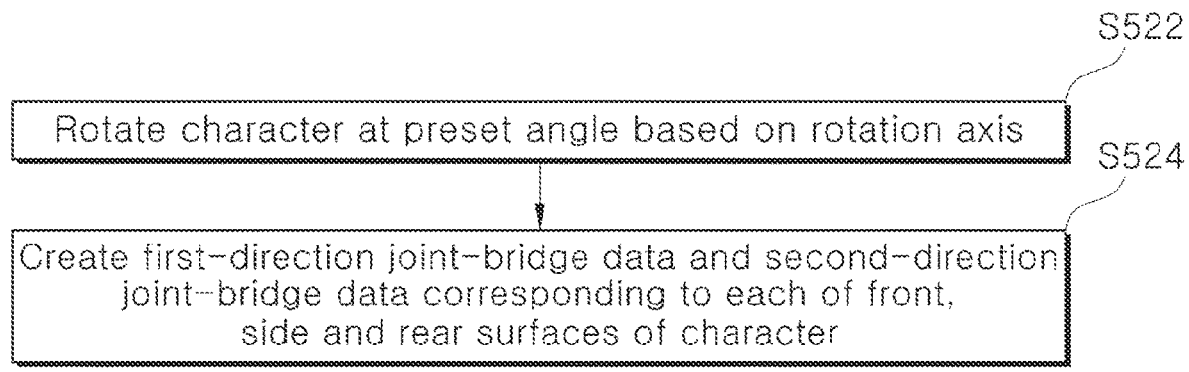
FIG. 11 is a flowchart illustrating a process of creating first-direction joint-bridge data or second-direction joint-bridge data according to the present disclosure.

FIG. 11 is a flowchart illustrating a process of creating first-direction joint-bridge data or second-direction joint-bridge data according to the present disclosure.

Figure 12:
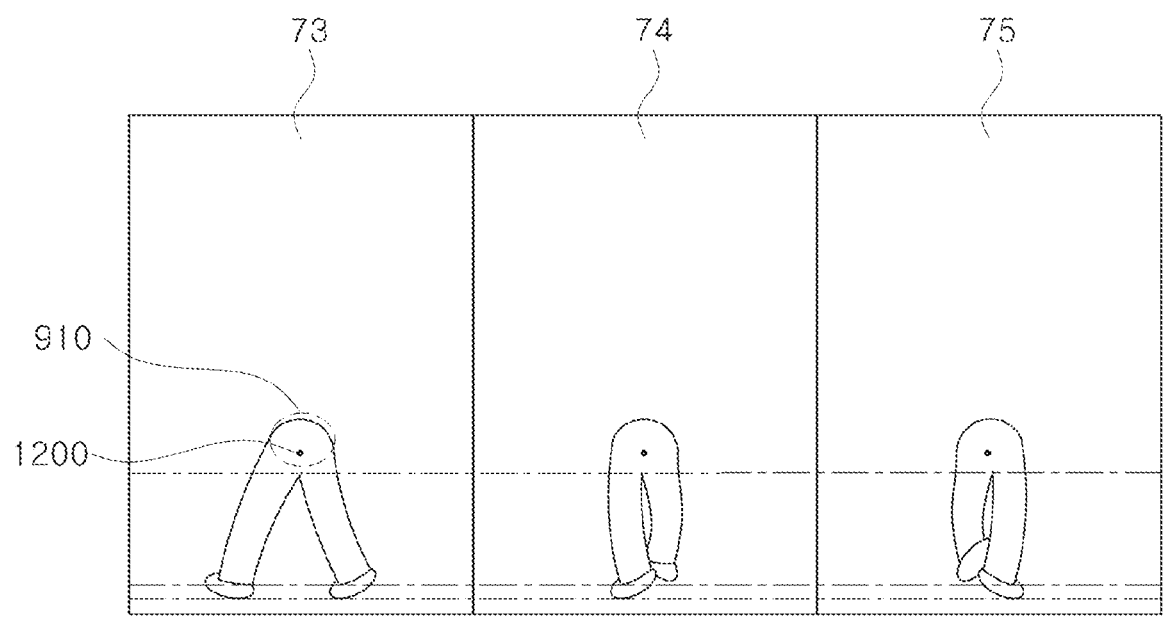
FIG. 12 is an exemplary view illustrating rotating a character at a preset angle, based on a rotation axis according to the present disclosure.

FIG. 12 is an exemplary view illustrating rotating a character at a preset angle, based on a rotation axis according to the present disclosure.

Figure 13:
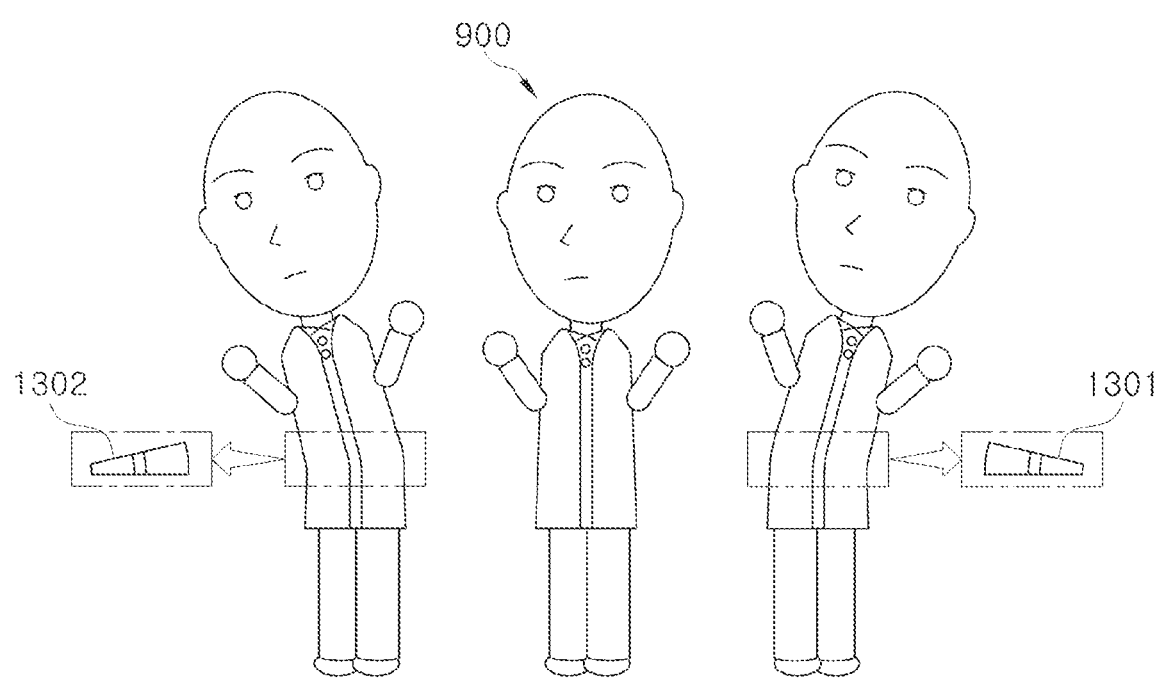
FIG. 13 is an exemplary diagram illustrating first-direction joint-bridge data and second-direction joint-bridge data created when a character is tilted from the front to the right and left according to the present disclosure.

FIG. 13 is an exemplary diagram illustrating first-direction joint-bridge data and second-direction joint-bridge data created when a character is tilted from the front to the right and left according to the present disclosure.

Figure 14:
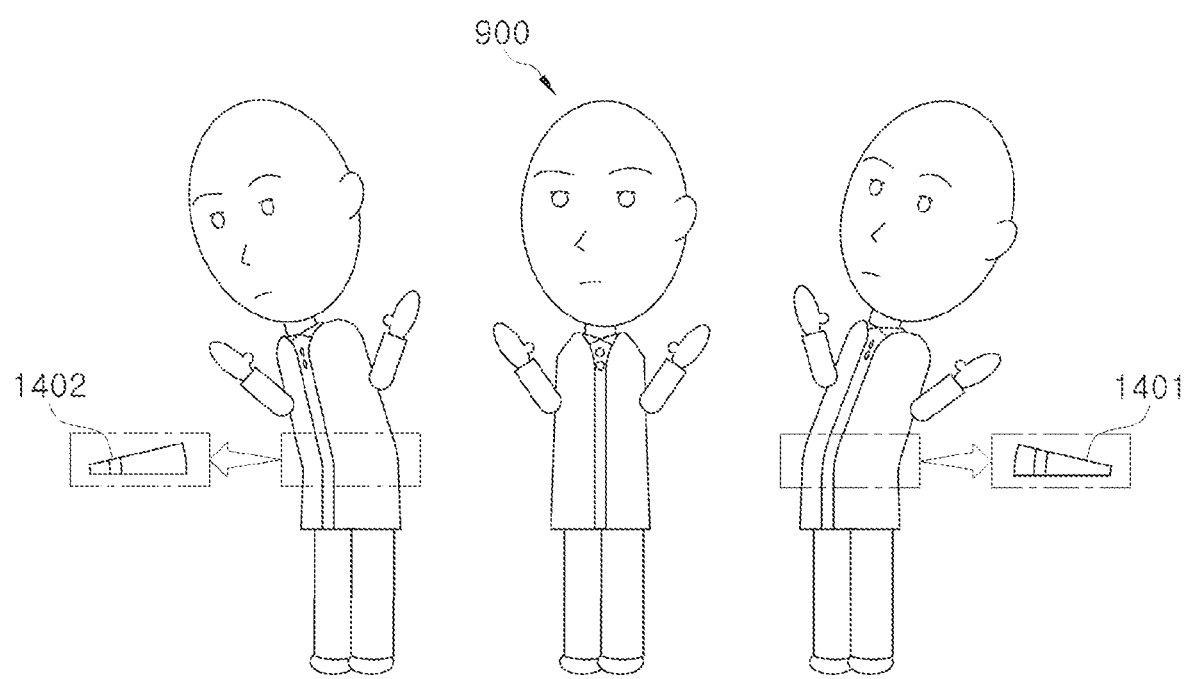
FIG. 14 is an exemplary diagram illustrating first-direction joint-bridge data and second-direction joint-bridge data that are created when a character is tilted from the side to the right and left according to the present disclosure.

FIG. 14 is an exemplary diagram illustrating first-direction joint-bridge data and second-direction joint-bridge data that are created when a character is tilted from the side to the right and left according to the present disclosure.

Figure 15:
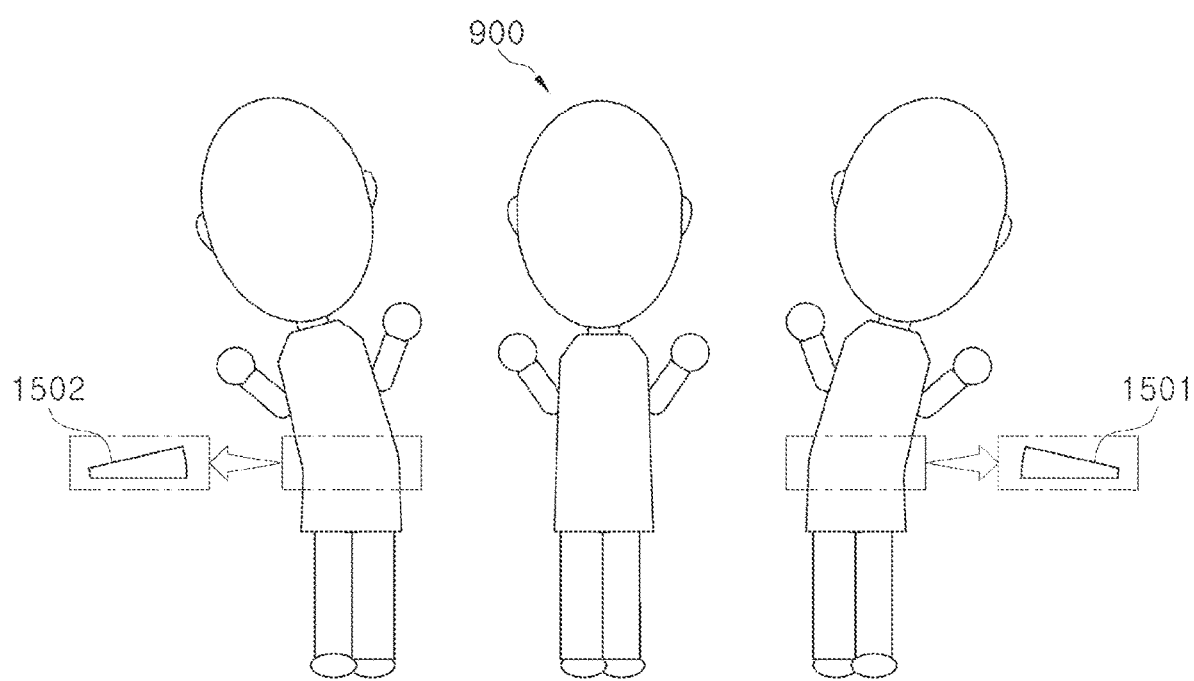
FIG. 15 is an exemplary diagram illustrating first-direction joint-bridge data and second-direction joint-bridge data that are created when a character is tilted from the rear to the right and left according to the present disclosure.

FIG. 15 is an exemplary diagram illustrating first-direction joint-bridge data and second-direction joint-bridge data that are created when a character is tilted from the rear to the right and left according to the present disclosure.

For example, referring to FIG. 10, when the first character 700 tilts its upper body 10 degrees to the right, which is the first direction, the first-direction joint-bridge data 710 may be created and displayed.

In addition, referring to FIG. 10, when the first character 700 tilts its upper body 10 degrees to the left, which is the second direction, the second-direction joint-bridge data 720 may be created and displayed.

The processor 130 may display the rotation axis on the character creation screen and rotate the character at a preset angle, based on the rotation axis (S522).

For example, referring to FIG. 12, the artboard 72, which is a character creation screen, is divided into three equal parts and displayed, and the first screen 73 may display the side of the lower body including the lower body-centered joint-bridge data 910.

In addition, the second screen 74 may display the front of the lower body including the lower body-centered joint-bridge data 910, and the third screen 75 may display the rear of the lower body including the lower body-centered joint-bridge data 910.

The processor 130 displays the rotation axis 1200 on each of the first screen 73, the second screen 74, and the third screen 75 where the lower body of the character is located, and the character 900 may be rotated by −10 and 10 degrees.

Since the processor 130 rotates the lower body of the character at a preset angle, based on the rotation axis 1200, the lower body-centered joint-bridge data 910 for the waist portion of the character 900 may be naturally adjusted and located.

The processor 130 may create the first-direction joint-bridge data and the second-direction joint-bridge data corresponding to each of the front, side, and rear surfaces of the character rotated according to the preset angle with respect to the rotation axis 1200 (S524).

The processor 130 may create the first-direction joint-bridge data and the second-direction joint-bridge data to correspond to the upper body or the lower body based on the central joint-bridge data created by being selected from the user terminal (not shown) in operation S516.

As an example, referring to FIG. 13, when the upper body is tilted by 10 degrees to the right in a first direction from the front of the character 900 with respect to the rotation axis 1200, the processor 130 may create the first-direction joint-bridge data 1301.

In addition, when the upper body is tilted by 10 degrees to the left in a second direction from the front of the character 900 with respect to the rotation axis 1200, the processor 130 may create and display the second-direction joint-bridge data 1302.

Accordingly, when the character 900 is tilted from the front to the right and left, the first-direction joint-bridge data 1301 and the second-direction joint-bridge data 1302 may be matched to appear naturally.

The first-direction joint-bridge data 1301 and the second-direction joint-bridge data 1302 may be a joint-bridge for a top worn by the character 900 as a joint-bridge for an upper body of the body of the character 900.

In addition, referring to FIG. 14, when the upper body is tilted by 10 degrees to the right in a first direction from the side of the character 900 with respect to the rotation axis 1200, the processor 130 may create the first-direction joint-bridge data 1101.

In addition, when the upper body is tilted by 10 degrees to the left in a second direction from the side of the character 900 with respect to the rotation axis 1200, the processor 130 may create and display the second-direction joint-bridge data 1102.

Accordingly, when the character 900 is tilted from the side to the right and left, the first-direction joint-bridge data 1401 and the second-direction joint-bridge data 1402 may be matched to appear naturally.

In addition, referring to FIG. 15, when the upper body is tilted by 10 degrees to the right in a first direction from the rear of the character 900 with respect to the rotation axis 1200, the processor 130 may create the first-direction joint-bridge data 1501.

In addition, when the upper body is tilted by 10 degrees to the left in a second direction from the rear of the character 900 with respect to the rotation axis 1200, the processor 130 may create and display the second-direction joint-bridge data 1502.

Accordingly, when the character 900 is tilted from the rear to the right and left, the first-direction joint-bridge data 1501 and the second-direction joint-bridge data 1502 may be matched to appear naturally.

The processor 130 may receive a selection of a first element motion design or a second element motion design corresponding to each of the central joint-bridge data, the first-direction joint-bridge data, or the second-direction joint-bridge data from a user terminal (not shown) and match the same to the character (S530).

The first element motion design may be one of designs corresponding to a plurality of motions of an upper body of the character's body, upper arms of the arms, and a thigh of the legs.

In addition, the second element motion design may be one of designs corresponding to a plurality of motions of a lower body of the character's body, lower arms of the arms, and a calf of the legs.

Details of the selection of the first element motion design or the second element motion design in operation S530 and matching with the character will be described with reference to FIGS. 16 to 18.

Figure 16:
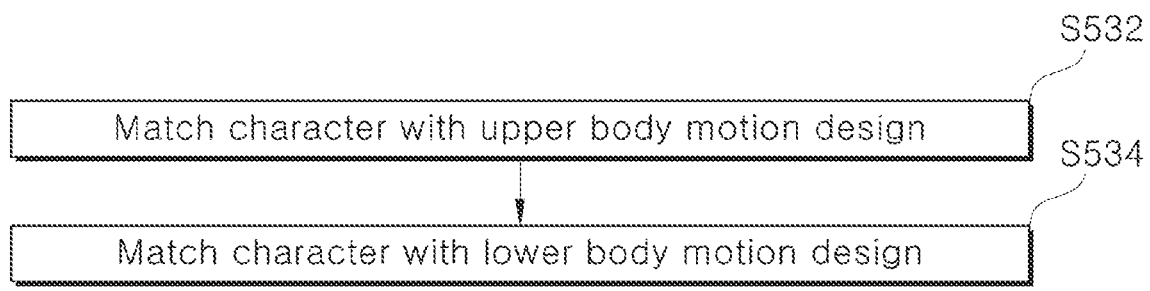
FIG. 16 is a flowchart illustrating a process of matching a character after a first element motion design or a second element motion design according to the present disclosure are chosen.

FIG. 16 is a flowchart illustrating a process of matching a character after a first element motion design or a second element motion design according to the present disclosure are chosen.

Figure 17:
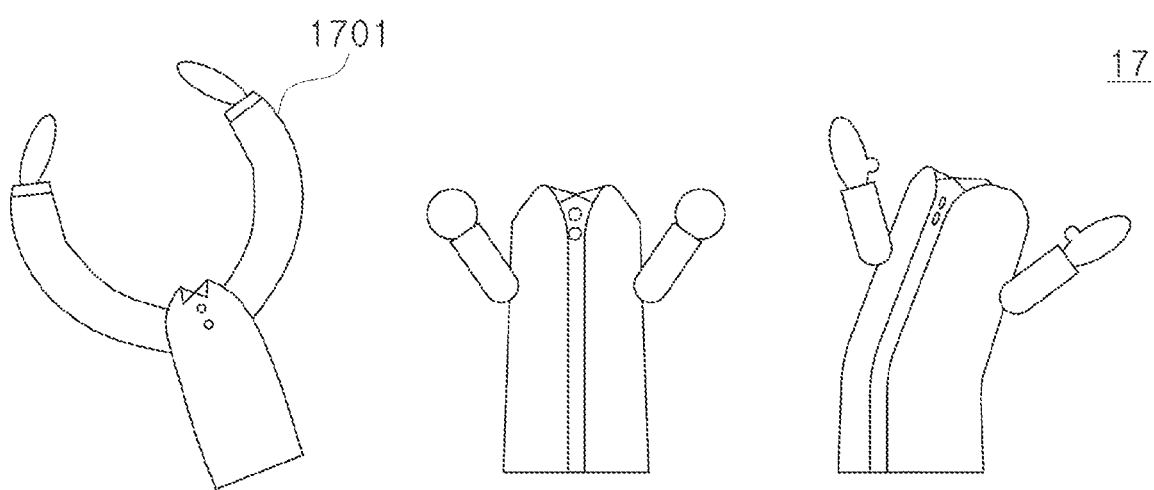
FIG. 17 is an exemplary diagram illustrating a plurality of upper body motion designs according to the present disclosure.

FIG. 17 is an exemplary diagram illustrating a plurality of upper body motion designs according to the present disclosure.

Figure 18:
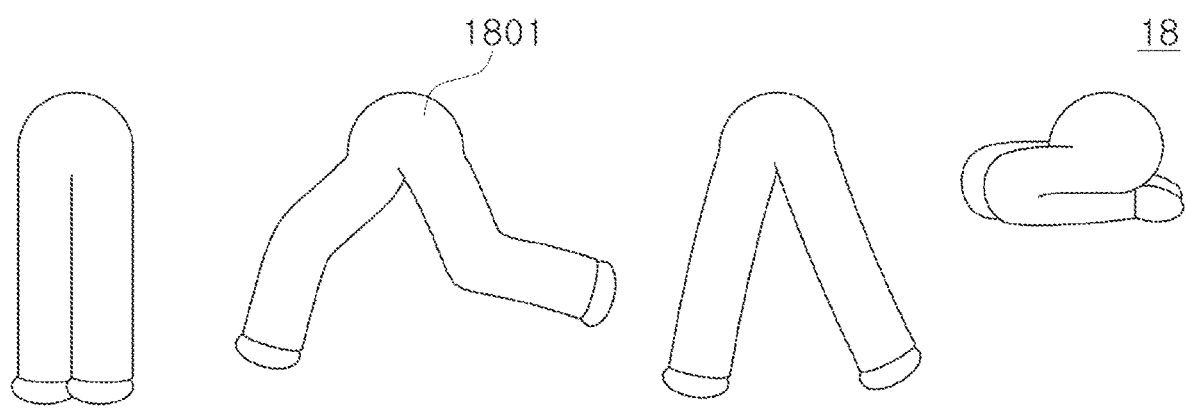
FIG. 18 is an exemplary diagram illustrating a plurality of lower body motion designs according to the present disclosure.

FIG. 18 is an exemplary diagram illustrating a plurality of lower body motion designs according to the present disclosure.

The processor 130 may receive a selection of an upper body motion design from among the first element motion designs corresponding to each of the upper body-centered joint-bridge data, the first direction joint-bridge data, or the second-direction joint-bridge data from a user terminal (not shown) to match the character with the upper body motion design (S532).

As an example, referring to FIG. 17, a user may select a first upper body motion design 1701 corresponding to each of the upper body-centered joint-bridge data, the first direction joint-bridge data, or the second-direction joint-bridge data among a plurality of upper body motion designs 17 from the user terminal (not shown).

The processor 130 may receive a selection of a lower body motion design from among the second element motion designs corresponding to each of the lower body-centered joint-bridge data, the first direction joint-bridge data, or the second-direction joint-bridge data from a user terminal (not shown) to match the character with the lower body motion design (S534).

As an example, referring to FIG. 18, a user may select a first lower body motion design 1801 corresponding to each of the lower body-centered joint-bridge data, the first direction joint-bridge data, or the second-direction joint-bridge data among a plurality of lower body motion designs 18 from the user terminal (not shown).

Figure 19:
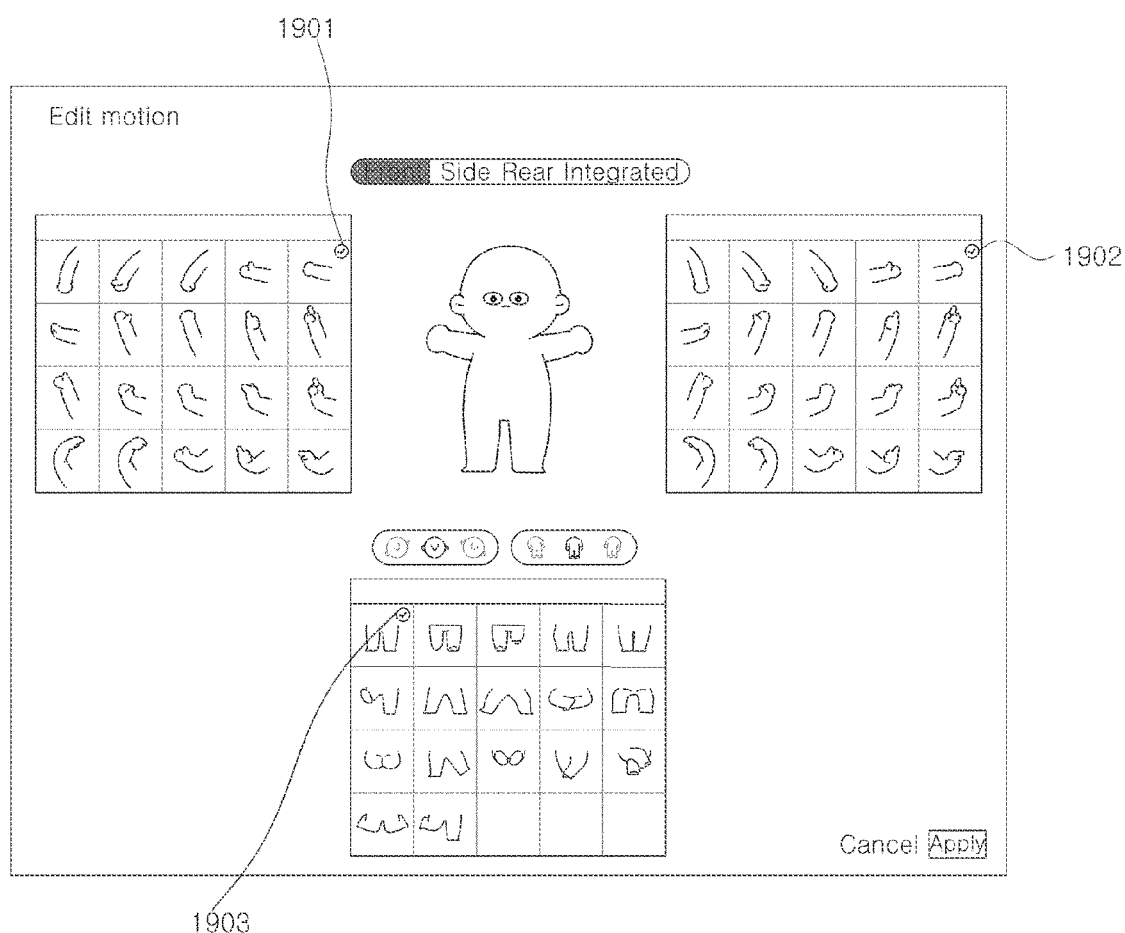
FIG. 19 is an exemplary diagram illustrating a plurality of upper and lower body motion designs according to the present disclosure.
Figure 20:
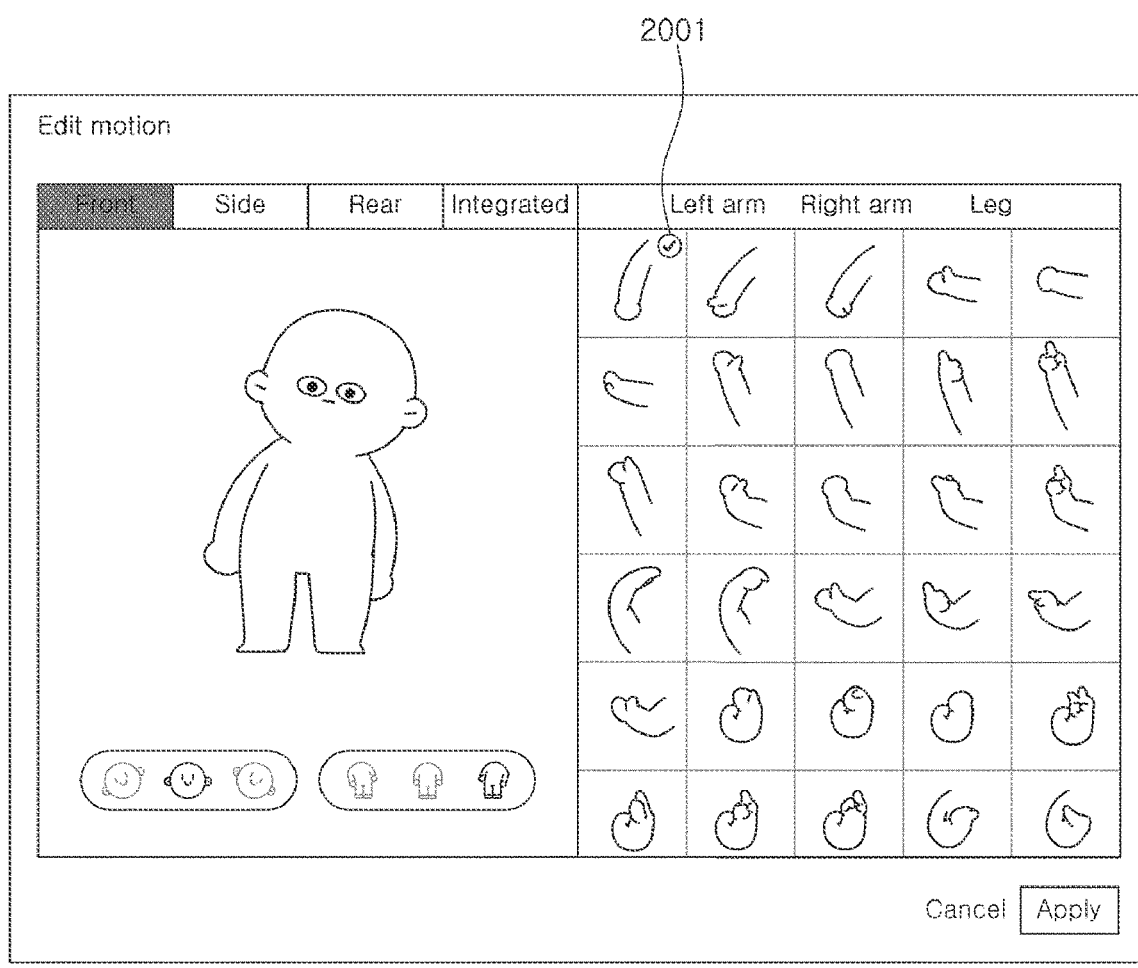
FIG. 20 is an exemplary diagram illustrating a plurality of left arm motion designs according to the present disclosure.
Figure 21:
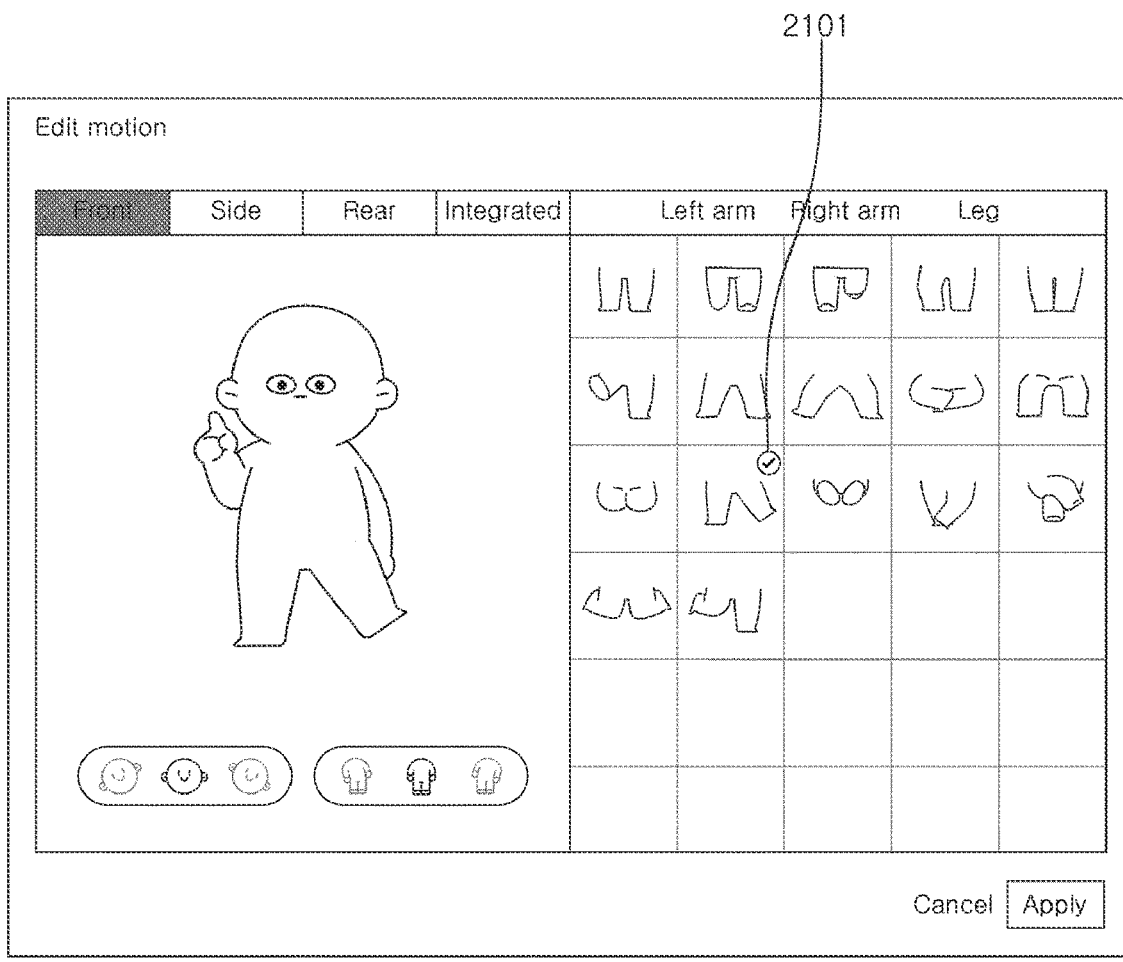
FIG. 21 is an exemplary diagram illustrating a plurality of leg motion designs according to the present disclosure.

FIG. 19 is an exemplary diagram illustrating a plurality of upper and lower body motion designs according to the present disclosure. FIG. 20 is an exemplary diagram illustrating a plurality of left arm motion designs according to the present disclosure. FIG. 21 is an exemplary diagram illustrating a plurality of leg motion designs according to the present disclosure.

Referring to FIG. 19, when a user inputs the 'front' button through the user terminal (not shown) among the 'front,' 'side,' 'rear,' and 'integrated' buttons provided in the upper center of the character creation service page, the processor 130 may display each design of the left arm, right arm, and leg from the front of the character.

In the character creation service page, a character created according to a user's input may be displayed in the center.

For example, when a user selects the first left arm design 1901 from among the plurality of left arm designs through the user terminal (not shown), the processor 130 may change the left arm from the overall design of the character displayed in the center to the first left arm design 1901 selected by the user and display the same.

In addition, when a user selects the first right arm design 1902 from among the plurality of right arm designs through the user terminal (not shown), the processor 130 may change the right arm from the overall design of the character displayed in the center to the first right arm design 1902 selected by the user and display the same.

In addition, when a user selects the first leg design 1903 from among the plurality of leg designs through the user terminal (not shown), the processor 130 may change the leg from the overall design of the character displayed in the center to the first leg design 1903 selected by the user and display the same.

Referring to FIG. 20, when a user inputs the 'front' button through the user terminal (not shown) among the 'front,' 'side,' 'rear,' and 'integrated' buttons provided in the upper left of the character creation service page, the processor 130 may display the entire design of the character from the front.

In addition, when a user inputs the 'left arm' button through the user terminal (not shown) among the 'left arm,' 'right arm,' and 'leg' buttons provided in the upper right of the character creation service page, the processor 130 may display a plurality of left arm designs corresponding to the left arm of the character from the front.

When a user selects the second left arm design 2001 from among the plurality of left arm designs through the user terminal (not shown), the processor 130 may change the left arm from the overall design of the character displayed on the left screen to the second left arm design 2001 selected by the user and display the same.

Referring to FIG. 21, when a user inputs the 'front' button through the user terminal (not shown) among the 'front', 'side', 'rear', and 'integrated' buttons provided in the upper left of the character creation service page, the processor 130 may display the entire design of the character from the front.

In addition, when a user inputs the 'leg' button through the user terminal (not shown) among the 'left arm,' 'right arm,' and 'leg' buttons provided in the upper right of the character creation service page, the processor 130 may display a plurality of leg designs corresponding to the leg of the character from the front.

When a user selects the second leg design 2101 from among the plurality of leg designs through the user terminal (not shown), the processor 130 may change the leg from the overall design of the character displayed on the left screen to the second leg design 2101 selected by the user and display the same.

Hereinabove, FIGS. 5, 6, 11, and 16 illustrate that each of a plurality of operations are sequentially executed, but this is merely illustrative of the technical idea of this embodiment. It is possible for those of ordinary skill in the technical field to which this embodiment belongs to apply various modifications and variations to executing by changing the order described in FIGS. 5, 6, 11, and 16 or executing one or more of operations among a plurality of operations in parallel within a range that does not deviate from the essential characteristics of this embodiment. FIGS. 5, 6, 11, and 16 do not limit a time series sequence.

The above-mentioned method according to the present disclosure may be implemented with a program (or an application) to be executed in combination with a computer, which is hardware, and may be stored in a medium. Here, the computer may be the device 10 described above.

For the computer to read the program and execute the methods implemented with the program, the above-mentioned program may include a code encoded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a predetermined procedure.

Further, such a code may further include a code associated with memory reference about whether additional information or media necessary for the processor of the computer to execute the functions is referred at any location (address number) of an internal or external memory of the computer.

Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The operations of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

DESCRIPTION OF REFERENCE NUMERALS

10: DEVICE
110: COMMUNICATION UNIT
120: MEMORY
130: PROCESSOR

The invention claimed is:

1. A method for automatically creating a cartoon image based on an input sentence, performed by a device, the method comprising:
    recognizing a sentence when at least one sentence is input;
    identifying each of at least one word included in the recognized sentence;
    identifying a type of punctuation mark located at least one of a start point and an end point of the recognized sentence;
    determining the sentence as any one of a general expression sentence, a dialogue expression sentence, and an emotional expression sentence based on the type of the identified punctuation mark;
    automatically creating a cartoon image based on a word included in the general expression sentence when the sentence is the general expression sentence, wherein the cartoon image includes at least one character having at least one theme;
    understanding a subject of the dialogue expression sentence or the emotional expression sentence when the sentence is the dialogue expression sentence or the emotional expression sentence; and
    inserting the dialogue expression sentence or the emotional expression sentence in a form of a speech bubble on a character corresponding to the understood subject among at least one character in the cartoon image.

2. The method of claim 1,
    wherein in the recognition of the sentence,
    when the at least one sentence is a plurality of sentences, each of words included in each of the plurality of sentences is identified, a sentence component of each of the identified words is understood, and a correlation between the plurality of sentences based on the understood sentence component is understood, so that the plurality of sentences are grouped into at least one paragraph, and
    wherein in the identification of the type of punctuation mark, a type of punctuation mark located at least one of a start point and an end point of at least one sentence included in the grouped paragraph is identified.

3. The method of claim 1, wherein in the determination of the sentence,
    when the identified punctuation mark is located only at an end point, the recognized sentence is determined to be the general expression sentence;
    when the type of the identified punctuation mark is double quotation marks, the recognized sentence is determined to be the dialogue expression sentence; and
    when the type of the identified punctuation mark is single quotation marks, the recognized sentence is determined to be the emotional expression sentence.

4. The method of claim 1, wherein the determination of the sentence further determines whether the sentence is an emotional expression sentence based on the type of the identified punctuation mark, and
    in the automatic creation, a face of a character corresponding to the understood subject with respect to the emotional expression sentence is displayed by zooming in at a preset magnification or by changing a shape of the face.

5. The method of claim 4, wherein in the determination of the sentence,
    when the identified punctuation mark is located at an end point and the type of the identified punctuation mark is any one of an exclamation mark and a question mark, the recognized sentence is determined to be the emotional expression sentence, and
    when a preset emoticon or abbreviation is located in the recognized sentence, the recognized sentence is determined to be the emotional expression sentence.

6. The method of claim 1, wherein in the automatic creation,
    when the word represents any one of a subject, an object, and a complement, the character having a theme corresponding to the word is created;
    when the word represents a place, a background of the cartoon image is created based on the word; and
    when the word represents time, brightness of the cartoon image is determined based on the word.

7. The method of claim 6, wherein the automatic creation determines a verb related to the created character in the general expression sentence, and creates the character to represent a motion corresponding to the determined verb.

8. The method of claim 7, wherein:
    the automatic creation determines a size and a location of the created character and a size and a location of the speech bubble based on an object arrangement algorithm; and when user's manipulation information for the cartoon image is input, the object arrangement algorithm builds a learning data set by matching the manipulation information with the cartoon image, and is machine learned based on the built learning data set.

9. A non-transitory computer-readable recording medium storing a program being executed by a hardware device, to perform the method according to claim 1.

10. A device for automatically creating a cartoon image based on an input sentence, the device comprising:
a communication unit for obtaining at least one sentence; and
a processor,
wherein the processor is configured to:
recognize the at least one sentence;
identify each of at least one word included in the recognized sentence;
identify a type of punctuation mark located at least one of a start point and an end point of the recognized sentence;
determine the sentence as any one of a general expression sentence, a dialogue expression sentence, and an emotional expression sentence based on the type of the identified punctuation mark;
automatically create a cartoon image based on a word included in the general expression sentence when the sentence is the general expression sentence, wherein the cartoon image is created to include at least one character having at least one theme;
understand a subject of the dialogue expression sentence or the emotional expression sentence when the sentence is the dialogue expression sentence or the emotional expression sentence; and
insert the dialogue expression sentence or the emotional expression sentence in a form of a speech bubble on a character corresponding to the understood subject among at least one character in the cartoon image.

11. The device of claim 10,
wherein when recognizing the sentence,
when the at least one sentence is a plurality of sentences, the processor is configured to:
identify each of words included in each of the plurality of sentences;
understand a sentence component of each of the identified words; and
understand a correlation between the plurality of sentences based on the understood sentence component, so that the plurality of sentences are grouped into at least one paragraph, and
wherein in the identification of the type of punctuation mark, the processor is configured to identify a type of punctuation mark located at least one of a start point and an end point of at least one sentence included in the grouped paragraph.

12. The device of claim 10, wherein when determining the sentence, the processor is configured to:
determine the recognized sentence as the general expression sentence when the identified punctuation mark is located only at an end point;
determine the recognized sentence as the dialogue expression sentence when the type of the identified punctuation mark is double quotation marks; and
determine the recognized sentence as the emotional expression sentence when the type of the identified punctuation mark is single quotation marks.

13. The device of claim 10, wherein
when determining the sentence, the processor is configured to:
further determine whether the sentence is an emotional expression sentence based on the type of the identified punctuation mark, and
when automatically creating the cartoon image, the processor is configured to:
display a face of a character corresponding to the understood subject with respect to the emotional expression sentence by zooming in at a preset magnification or by changing a shape of the face.

14. The device of claim 13, wherein when determining the sentence, the processor is configured to:
determine the recognized sentence as the emotional expression sentence when the identified punctuation mark is located at an end point and the type of the identified punctuation mark is any one of an exclamation mark and a question mark; or
determine the recognized sentence as the emotional expression sentence when a preset emoticon or abbreviation is located in the recognized sentence.

15. The device of claim 10, wherein when automatically creating the cartoon image, the processor is configured to:
create the character having a theme corresponding to the word when the word represents any one of a subject, an object, and a complement;
create a background of the cartoon image based on the word when the word represents a place; and
determine brightness of the cartoon image based on the word when the word represents time.

16. The device of claim 15, wherein when automatically creating the cartoon image, the processor is configured to:
determine a verb related to the created character in the general expression sentence; and
create the character to represent a motion corresponding to the determined verb.

17. The device of claim 16, wherein when automatically creating the cartoon image, the processor is configured to:
determine a size and a location of the created character and a size and a location of the speech bubble based on an object arrangement algorithm; and
wherein when user's manipulation information for the cartoon image is input, the object arrangement algorithm builds a learning data set by matching the manipulation information with the cartoon image, and is machine learned based on the built learning data set.

18. The device of claim 10, wherein when automatically creating the cartoon image, the processor is configured to:
create and display central joint-bridge data connecting joint portions separated into a first element and a second element of the character when the character is created;
create and display first-direction joint-bridge data connecting the first element and the second element of the character in a first direction or second-direction joint-bridge data connecting the first element and the second element of the character in a second direction; and
receive a selection of a first element motion design or a second element motion design corresponding to each of the central joint-bridge data, the first direction joint-bridge data, or the second-direction joint-bridge data from a user terminal, and match the character.

19. The device of claim 18, wherein the joint-bridge is disposed to overlap a blank area between the first element and the second element of the character.

20. The device of claim 19, wherein in the creating and displaying of the second-direction joint-bridge data, the processor creates and displays the first-direction joint-bridge data and the second-direction joint-bridge data by rotating the character based on a rotation axis.

* * * * *